(12) United States Patent
Wilkinson et al.

(10) Patent No.: US 11,586,483 B2
(45) Date of Patent: *Feb. 21, 2023

(54) SYNCHRONIZATION AMONGST PROCESSOR TILES

(71) Applicant: Graphcore Limited, Bristol (GB)

(72) Inventors: Daniel John Pelham Wilkinson, West Harptreee (GB); Simon Christian Knowles, Corston (GB); Matthew David Fyles, Wiltshire (GB); Alan Graham Alexander, Wotton-Under-Edge (GB); Stephen Felix, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,904

(22) Filed: May 14, 2021

(65) Prior Publication Data

US 2021/0271527 A1 Sep. 2, 2021

Related U.S. Application Data

(63) Continuation of application No. 15/885,972, filed on Feb. 1, 2018, now Pat. No. 11,023,290.

(30) Foreign Application Priority Data

Oct. 20, 2017 (GB) .................................. 1717298.2

(51) Int. Cl.
*G06F 9/30* (2018.01)
*G06F 9/52* (2006.01)
(Continued)

(52) U.S. Cl.
CPC ............ *G06F 9/522* (2013.01); *G06F 9/3009* (2013.01); *G06F 9/30087* (2013.01);
(Continued)

(58) Field of Classification Search
CPC .... G06F 9/522; G06F 9/30087; G06F 9/3009; G06F 9/3851; G06F 9/3897;
(Continued)

(56) References Cited

U.S. PATENT DOCUMENTS

| 5,307,483 A | 4/1994 | Knipfer |
| 7,694,302 B1 | 4/2010 | Rajan |

(Continued)

FOREIGN PATENT DOCUMENTS

| JP | 2017-138780 A | 8/2017 |
| TW | 201702866 | 1/2017 |
| TW | 201734763 | 10/2017 |

OTHER PUBLICATIONS

Office Action for Korean Patent Application No. 10-2018-0126032 dated Mar. 30, 2020.

(Continued)

*Primary Examiner* — Corey S Faherty
(74) *Attorney, Agent, or Firm* — Haynes and Boone, LLP

(57) ABSTRACT

A processing system comprising an arrangement of tiles and an interconnect between the tiles. The interconnect comprises synchronization logic for coordinating a barrier synchronization to be performed between a group of the tiles. The instruction set comprises a synchronization instruction taking an operand which selects one of a plurality of available modes each specifying a different membership of the group. Execution of the synchronization instruction cause a synchronization request to be transmitted from the respective tile to the synchronization logic, and instruction issue to be suspended on the respective tile pending a synchronization acknowledgement being received back from the synchronization logic. In response to receiving the synchronization request from all the tiles in the group as specified by the operand of the synchronization instruction, (Continued)

the synchronization logic returns the synchronization acknowledgment to the tiles in the specified group.

20 Claims, 16 Drawing Sheets

(51) Int. Cl.
*G06F 9/38* (2018.01)
*G06F 15/80* (2006.01)
*G06N 20/00* (2019.01)
*G06F 9/48* (2006.01)

(52) U.S. Cl.
CPC .......... *G06F 9/3851* (2013.01); *G06F 9/3897* (2013.01); *G06F 9/4881* (2013.01); *G06F 15/8015* (2013.01); *G06N 20/00* (2019.01); *G06F 9/3885* (2013.01)

(58) Field of Classification Search
CPC .. G06F 9/4881; G06F 15/8015; G06F 9/3885; G06F 15/17325; G06N 20/00; G06N 3/084; G06N 3/105; G06N 5/022
See application file for complete search history.

(56) References Cited

U.S. PATENT DOCUMENTS

| | | | |
|---|---|---|---|
| 7,818,725 B1 | 10/2010 | Agarwal | |
| 8,607,247 B2 | 10/2013 | Howes | |
| 9,038,088 B2* | 5/2015 | Phull | G06F 9/5083 713/400 |
| 9,678,806 B2* | 6/2017 | Che | G06F 9/5083 |
| 2011/0078417 A1 | 3/2011 | Fahs | |
| 2014/0006724 A1* | 1/2014 | Gray | G06F 13/1689 711/147 |
| 2015/0067369 A1* | 3/2015 | Henry | G06F 1/32 713/323 |

OTHER PUBLICATIONS

Office Action for Taiwan Patent Application No. 107136464 dated Aug. 14, 2019.
UK Combined Search and Examination Report for Application No. GB1717297.4 dated Apr. 11, 2019.
Office Action for U.S. Appl. No. 15/886,185 dated May 22, 2019.
Office Action dated Oct. 22, 2019 for Taiwan Patent Application No. 10820993820. 4 pages.

\* cited by examiner

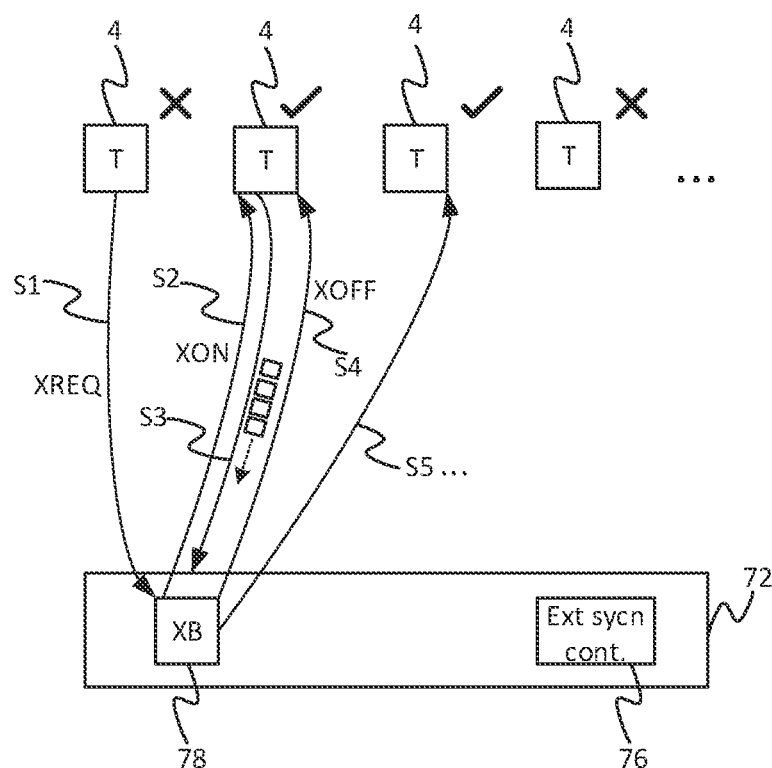

SYNCHRONIZATION AMONGST PROCESSOR TILES

CROSS-REFERENCE TO RELATED APPLICATIONS

The present application is a continuation of U.S. patent application Ser. No. 15/885,972, filed Feb. 1, 2018, which claims the priority benefit of United Kingdom Patent Application No. 1717298.2, filed Oct. 20, 2017, the disclosures of which are incorporated herein by reference in their entireties.

TECHNICAL FIELD

The present disclosure relates to synchronizing the workloads of multiple different tiles in a processor comprising a multi-tile processing arrangement, each tile comprising its own processing unit and memory. For instance, this may be used in bulk synchronous parallel (BSP) communication schemes whereby each of a group of tiles must complete a compute phase before any of the tiles in the group can proceed to an exchange phase.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions.

The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the code run on the different tiles to communicate between tiles. In some cases the processing unit on each tile may itself run multiple concurrent threads on tile, each tile having its own respective set of contexts and corresponding pipeline as described above in order to support interleaving of multiple threads on the same tile through the same pipeline.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

In general, there may exist dependencies between the portions of a program running on different tiles. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile performing computation may be allowed to communicate with other system resources such as a network card or storage disk, as long as no communication with other tiles in the group is involved.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

In an interconnected system of senders and receivers that may also have compute tasks to perform in between communicating with one another, there are essentially three ways the senders and receivers can implement this. The first is the "rendez vous" approach. According to this approach the sender signals to the receiver when it is ready to send data and the receiver signals to the sender when it is ready to receive data. If the sender has data ready to send but the receiver is performing some other, compute task, then the sender must either wait for the receiver to finish its computing task and signal its readiness to receive data from the sender, or else the sender must interrupt the receiver. Similarly if the receiver requires data from the sender while the sender is still performing some other, compute task, then the receiver must either wait for the sender to finish its compute task and signal its readiness to send data to the receiver, or else the receiver must interrupt the sender. The rendez vous approach has the advantage that it does not require queues to queue the transmitted data, since communication of the data only proceeds once both sender and receiver have agreed they are ready to communicate. However, the downside is latency: the senders and receivers will spend a lot of time waiting for one another, or else will have to perform a lot of interrupts which also incur a latency penalty. The latency ultimately manifests itself as reduced throughput.

The second possibility is the "post-box" approach. According to this approach the sender does not wait for the receiver before sending its data. Instead the transmitted data is buffered in a queue, from which the receiver reads the data when it is ready. As long as the queues are long enough then this solves the latency problem of the rendez vous approach. However, if the queues fill up then the process stalls and in effect the communications fall back to the rendez vous approach. To reduce the chance of this the queues need to be made long compared to the amount of data likely to be transmitted. But queues incur a significant silicon footprint, especially in an array of many potential combinations of senders and receivers. Also, in practice the queues cannot be made indefinitely long.

Bulk synchronous parallel (BSP) provides a third way: each tile performs a certain defined amount of compute processing in a compute phase, then all tiles synchronize together (a barrier synchronization) before advancing to an exchange phase. This does not incur as much latency as the rendez vous approach, and does not incur as much queuing as the post-box approach.

SUMMARY

The downside to BSP is that it requires load balancing, typically performed by the compiler at compile time, in order ensure that the different tiles each have about the same amount of processing as one another to perform in each compute phase, and about the same amount data to exchange as one another in each exchange phase. Any difference between tiles in terms of the compute load and/or exchange load per BSP cycle (and in practice there will always be some degree of difference) will result in some of the tiles having to wait for some others to reach the point where they are ready to synchronize. Ultimately this "waiting about be experienced as reduced throughput of the program.

Whilst this issue may be tolerable across groups of tiles on a certain scale, the throughput penalty will be exacerbated by other factors the greater the physical separation between tiles, such as when BSP synchronization and exchange is applied in communications between different chips (dies), different IC packages, or different cards, or different physical boxes (i.e. different housings, e.g. different server chassis). That is, a greater penalty will be incurred in communicating between tiles that are spaced further apart, and/or separated by physical breakpoints (boundaries) such as between chips, packages or cards. Less local communications (such as off-chip vs. on-chip communications) will experience longer latency and greater uncertainty. For instance connections between chips tend to have a lower wiring density than on-chip due to limitations imposed by the package, and hence less available data bandwidth. Also, wires reach further and hence are more capacitive, and more vulnerable to noise (which may result in loss and hence the need for retransmission at the physical layer). Further, as well as a greater physical distance, signalling and data transfer between chips typically traverses a greater amount of logic such as SerDes (serializers-deserializers) and flow control mechanisms, all of which adds extra delay compared to internal communications.

Similar issues may be experienced when any form of barrier synchronization is applied across an arrangement of multiple tiles (not specifically just in communications limited to a BSP scheme).

Accordingly, it would be desirable to enable an inter-tile synchronization scheme whereby some synchronizations are kept local to subsets of the tiles in the system, whilst only at other times is the penalty of a wider (e.g. global) synchronization incurred. For instance, it may be desirable to keep the synchronization & exchange of some BSP stages to a first, lower hierarchical level of zone (e.g. on-chip) whilst only on other BSP stages are the synchronization & exchange performed across zones at a second, higher hierarchical level (e.g. off-chip or global). Or more generally, it may be desirable to enable the flexibility to divide off different synchronization zones such that some tiles are synchronized with a group of their neighbours whilst remaining independent (asynchronous) of one or more other internally-synchronous groups, with this grouping being selectable.

Furthermore, it is recognized herein that it would be desirable to tailor the instruction set of a processor to large-scale parallel applications such as machine learning. According to the present disclosure, this is achieved by providing a dedicated machine code instruction for synchronizing amongst a selected group of processor tiles in a multi-tile arrangement (e.g. a selected level of hierarchically nested zones), wherein the group is specified by a mode operand of the instruction. When executed, the opcode of the dedicated machine code instruction triggers hardwired logic in the interconnect between tiles to perform the sync signalling amongst only the specified group of tiles, preferably via dedicated sync wires. Thus the sync instruction provides the ability to synchronize amongst a desired set or subset of tiles with a reduced latency and lower code density.

According to one aspect disclosed herein, there is provided a processing system comprising an arrangement of tiles and an interconnect for communicating between the tiles, wherein:

each tile comprises an execution unit for executing machine code instructions, each being an instance of a predefined set of instruction types in an instruction set of the processor, each instruction type in the instruction set being defined by a corresponding opcode and zero or more operand fields for taking zero or more operands;

the interconnect comprises synchronization logic in the form of hardware logic for coordinating a barrier synchronization to be performed between a group of said tiles;

the instruction set comprises a synchronization instruction taking at least one operand which selects one of a plurality of available modes each specifying a different membership of said group from amongst a plurality of different available groupings, wherein the execution unit on each respective tile is configured so as in response to the opcode of the synchronization instruction to cause a synchronization request to be transmitted from the respective tile to the synchronization logic in the interconnect, and to suspend instruction issue on the respective tile pending a synchronization acknowledgement being received back from the synchronization logic; and the synchronization logic is configured so as, in response to receiving the synchronization request from all of the tiles of said group as specified by the operand of the synchronization instruction, to return the synchronization acknowledgment back to each of the tiles in the group and thereby allow the instruction issue to resume on each of the tiles in said group.

I.e. the modes of the synchronization instruction specify different respective groups or zones of tiles as forming the set amongst which the synchronization is performed.

In embodiments, said different groupings may comprise a plurality of different hierarchal zones, with at least one lower level zone being nested within at least one higher level zone.

In embodiments, said different groupings may comprise a plurality of different non-hierarchical groupings.

In embodiments, said modes may include an internal mode specifying that said group consists of all the tiles on the same chip but none beyond.

In embodiments, said modes may include a global mode specifying that said group consist of all the tiles in said arrangement.

In embodiments, said modes may include an on-package mode specifying that said group consists of all the tiles on the same IC package but none beyond, the IC package comprising one or more chips each comprising a respective array of said tiles.

In embodiments, said modes may include an on-card mode specifying that said group consists of all the tiles on all of a plurality of chips on a same card, but none beyond.

In embodiments, said modes may include an in-box mode specifying that said group consists of all the tiles on all of a plurality of chips in a same physical housing, but none beyond.

In embodiments, the synchronization logic may be configured to halt the group of tiles in event of inconsistency in the mode specified by the instances of the synchronization instructions from different tiles.

In embodiments, the synchronization logic may be configured to enact said halt by refraining from returning the synchronisation acknowledgement.

In embodiments, the synchronization logic may be configured to raise an exception to an external CPU in event of inconsistency in the mode specified by the instances of the synchronization instructions from different tiles.

In embodiments each tile may comprise:

multiple context register sets, each context register set arranged to store a program state of a respective one of multiple threads; and a scheduler arranged to schedule one of a plurality of worker threads to execute in each of a plurality of time slots in a repeating sequence of interleaved time slots, with the program state of each of the worker threads being stored in a different one of said context register sets;

wherein the synchronization request from a given tile may be sent to the synchronization logic when all the worker threads on that tile have completed a compute phase.

In embodiments, the instruction set may comprise an exit instruction for inclusion in each of the worker threads, and the execution stage may be configured to terminate its worker thread in response to the opcode of the exit instruction, and to cause the synchronization request to be sent to the synchronization logic when all of said plurality of worker threads have executed an instance of the exit instruction.

In embodiments:

at least one of said groupings may span multiple different chips;

each respective one of said chips may be configured to produce a respective exit state resulting from the instances of the exit instruction being executed by all of the plurality of worker threads on each of a plurality of participating tiles on the respective chip;

the interconnect may comprise an external interconnect connecting together the multiple chips;

the synchronization logic may comprise, in the external interconnect, a respective sync block associated with each of the multiple chips;

the external interconnect may be operable such that the sync block associated with one of the multiple chips acts as a master of the group, and the external interconnect connects the multiple chips together via their sync blocks in a topology of one or more chains leading toward the master;

in the or each chain, the sync block associated with each chip may be configured to propagate a running aggregate of the respective exit states along the chain toward the master, and the master may be configured to produce a global aggregate aggregating the exit state of the master's chip and the running aggregate or aggregates from the or each chain, and to propagate the global aggregate back down the or each chain to the multiple chips;

from each chip to the next in the or each chain, the connection between the associated sync block may comprise a first synchronization request wire, a second synchronization request wire, a first synchronization acknowledgment wire and a second synchronization acknowledgement wire;

the sync blocks may be configured to use a selected one of the first and second synchronization wires to propagate the synchronization request, and to use a selected one of the first and second synchronization acknowledgement wires to propagate the synchronization acknowledgment request from the second chip to the first chip;

the running aggregate may be signalled as either a first value or a second value by the selection of the first or second synchronization request wire respectively when propagating said synchronization request, and the global exit state may be signalled as either a first value or a second value by the selection of the first or second synchronization acknowledgment wire respectively when propagating said synchronization acknowledgment.

In embodiments, the processing system may be programmed to conduct communications between the tiles of said group according to a bulk synchronous parallel scheme, whereby each of the tiles in the group performs an on-tile compute phase followed by an inter-tile exchange phase, with the barrier synchronization being implemented between the compute and exchange phases such that the exchange phase only proceeds once all the tiles in the group have completed the compute phase; wherein the completion of the compute phase may be indicated by the synchronization request from each tile in the group, with the exchange phase being released to proceed by the synchronization acknowledgment.

In embodiments, the processing system may be programmed to apply separate instances of the bulk synchronous parallel scheme in different groups of tiles, the exchange within each group being performed synchronously according to the bulk synchronous parallel scheme, but asynchronously between the groups.

In embodiments, the processing system may be programmed to apply different instances of the barrier synchronization at different stages in each of a series of repeating iterations, each instance of the barrier synchronization synchronizing amongst a respective one of said hierarchical levels of zone as specified by the operand of the synchronization instruction, with at least some of the stages per iteration synchronizing amongst different levels of hierarchical zone.

In embodiments, the stages of each iteration may comprise:
one or more instance of the compute phase each followed by a corresponding instance of the barrier synchronization within each of one or more zones at a first, lower-level one of said hierarchical levels, and then
an instance of the barrier synchronization across a zone of a second, higher-level one of said hierarchical levels.

In embodiments, the instruction set may further include an abstain instruction, which causes the tile on which the abstain instruction is executed to be opted-out of said group when otherwise specified by the operand of the synchronization instruction.

In embodiments, the processing system may be programmed to perform a machine intelligence algorithm in which each node in a graph has one or more respective input edges and one or more respective output edges with the input edges of at least some of the nodes being the output edges of at least some others of the nodes, each node comprising a respective function relating its output vertices to its input edges, with each respective function being parameterized by one or more respective parameters, and each of the respective parameters having an associated error, such that the graph converges toward a solution as the errors in some or all of the parameters reduce; wherein each of the tiles may model a respective subgraph comprising a respective subset of the nodes in the graph.

According to another aspect disclosed herein, there is provided a method of operating a processing system comprising an arrangement of tiles and an interconnect for communicating between the tiles, wherein each tile comprises an execution unit for executing machine code instructions, each being an instance of a predefined set of instruction types in an instruction set of the processor, each instruction type in the instruction set being defined by a corresponding opcode and zero or more operand fields for taking zero or more operands; the method comprising:
using synchronization logic in the form of hardware logic to coordinate a barrier synchronization to be performed between a group of said tiles;
wherein the instruction set comprises a synchronization instruction taking at least one operand which selects one of a plurality of available modes each specifying a different membership of said group from amongst a plurality of different available groupings, the method comprising, on each respective tile, executing an instance of the synchronization instruction and in response to the opcode of the synchronization instruction causing a synchronization request to be transmitted from the respective tile to the synchronization logic in the interconnect, and suspending instruction issue on the respective tile pending a synchronization acknowledgement being received back from the synchronization logic; and
wherein the method further comprises the synchronization logic, in response to receiving the synchronization request from all of the tiles of said group as specified by the operand of the synchronization instruction, returning the synchronization acknowledgment back to each of the tiles in the group and thereby allowing the instruction issue to resume on each of the tiles in said group.

According to another aspect disclosed herein, there is provided computer program product comprising code embodied on computer-readable storage and configured to run on the processing system of any embodiment disclosed herein, the code comprising a portion of code for execution on each tile, each portion comprising at least one instance of the synchronization instruction

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

The following describes components of a processor having an architecture which has been developed to address issues arising in the computations involved in machine intelligence applications. The processor described herein may be used as a work accelerator; that is, it receives a workload from an application running on a host computer, the workload generally being in the form of very large data sets to be processed (such as the large experience data sets used by a machine intelligence algorithm to learn a knowledge model, or the data from which to perform a prediction or inference using a previously-learned knowledge model). An aim of the architecture presented herein is to process these very large amounts of data highly efficiently. The processor architecture has been developed for processing workloads involved in machine intelligence. Nonetheless, it will be apparent that the disclosed architecture may also be suitable for other workloads sharing similar characteristics.

Figure 1:
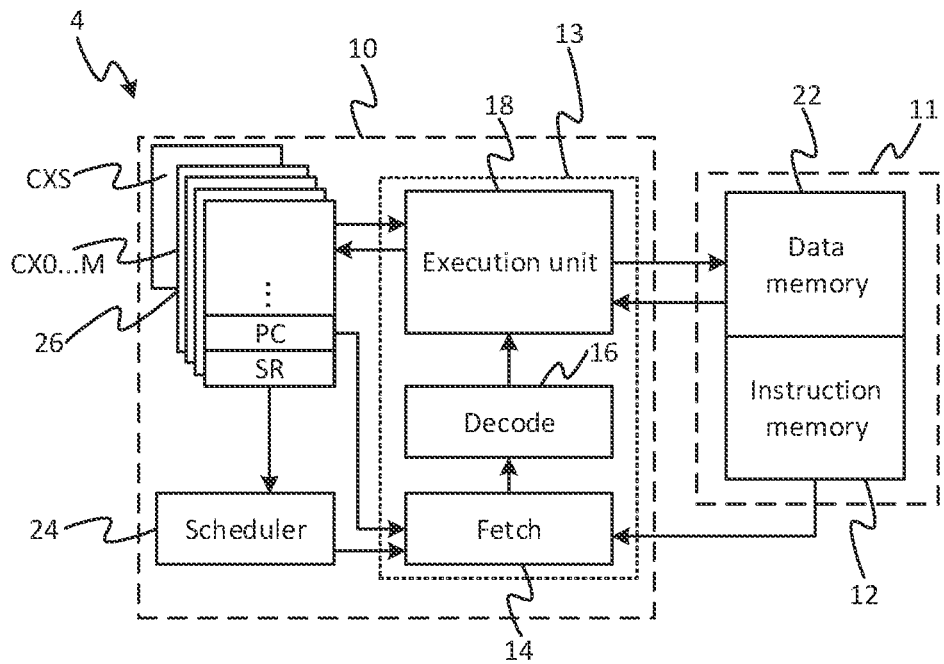
FIG. 1 is a schematic block diagram of a multi-threaded processing unit.

FIG. 1 illustrates an example of a processor module 4 in accordance with embodiments of the present disclosure. For instance the processor module 4 may be one tile of an array of like processor tiles on a same chip, or may be implemented as a stand-alone processor on its own chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 2:
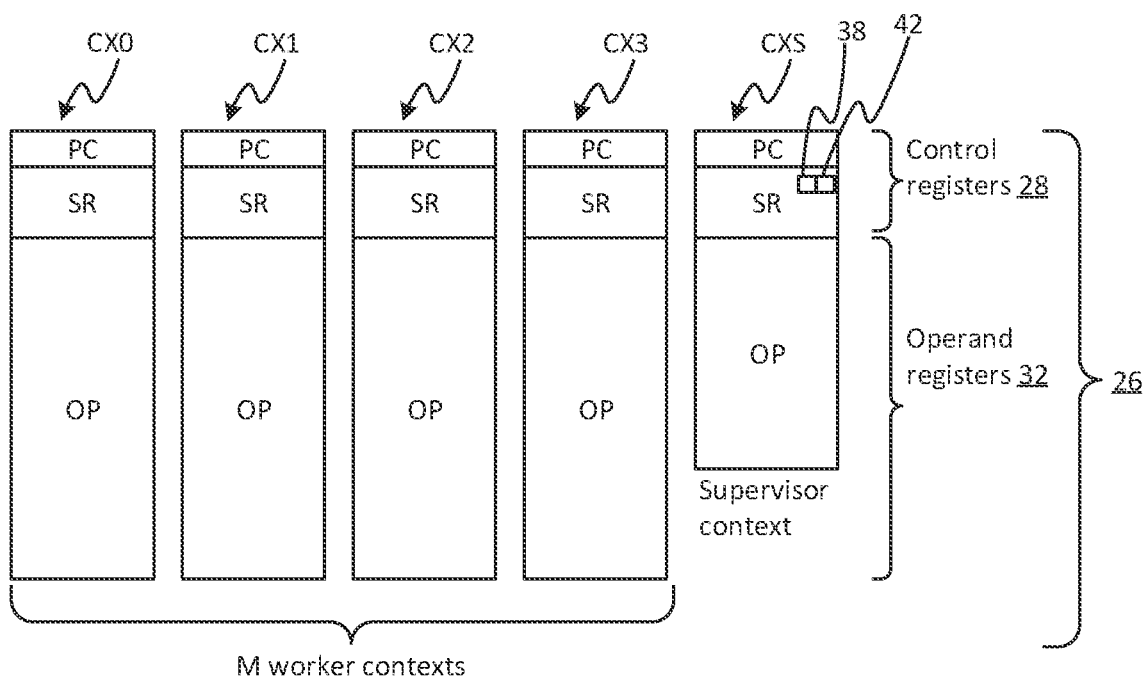
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As will be discussed in more detail later, the disclosed arrangement has one worker context register file CX0 . . . CX(M−1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processor module 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution unit is capable of executing concurrently, i.e. the number of concurrent slots the execution unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
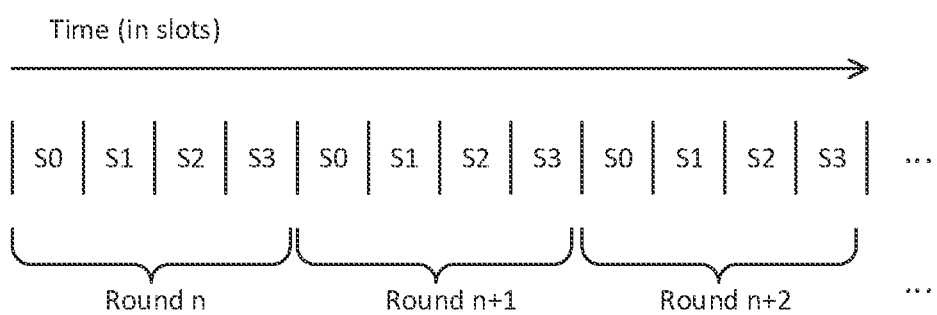
FIG. 3 schematically illustrates a scheme of interleaved execution time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

Whatever the number of time slots the round-robin scheme is divided into, then according to present disclosure, the processing unit 10 comprises one more context register file 26 than there are time slots, i.e. it supports one more context than the number of interleaved timeslots it is capable of barrel-threading.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of a plurality of "worker threads" currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities. For example, the supervisor thread may be responsible for performing barrier synchronisations to ensure a certain order of execution.

E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

Note of course that four time slots is just an example, and generally in other embodiments there may be other numbers, such that if there are a maximum of M time slots 0 . . . M-1 per round, the processor module 4 comprises M+1 contexts CX . . . CX(M-1) & CXS, i.e. one for each worker thread that can be interleaved at any given time and an extra context for the supervisor. E.g. in one exemplary implementation there are six timeslots and seven contexts.

Figure 4:
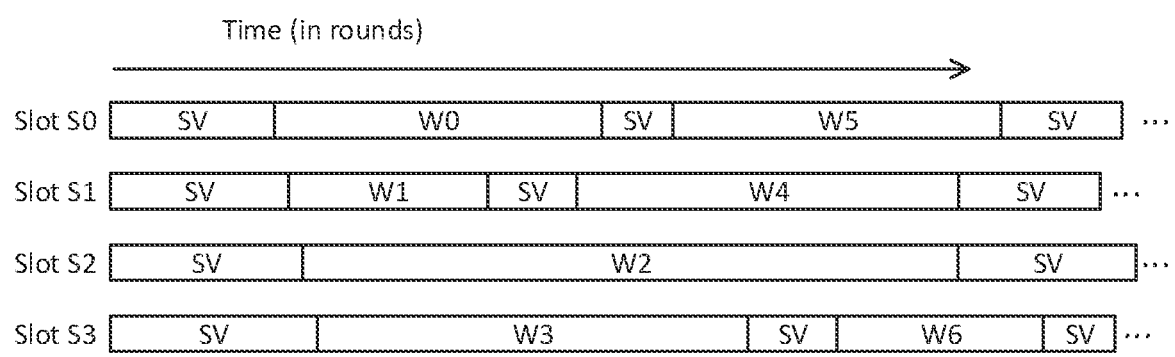
FIG. 4 schematically illustrates a supervisor thread and plurality of worker threads.

Referring to FIG. 4, the supervisor thread SV does not have its own time slot per se in the scheme of interleaved time slots. Nor do the workers as allocation of slots to worker threads is flexibly defined. Rather, each time slot has its own dedicated context register file (CX0 . . . CXM-1) for storing worker context, which is used by the worker when the slot is allocated to the worker, but not used when the slot is allocated to the supervisor. When a given slot is allocated to the supervisor, that slot instead uses the context register file CXS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM-1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a relinquish instruction, called "RUN" by way of example herein. In embodiments this instruction takes two operands: an address of a worker thread in the instruction memory 12 and an address of some data for that worker thread in the data memory 22:

RUN task_addr, data_addr The worker threads are portions of code that can be run concurrently with one another, each representing one or more respective computation tasks to be performed. The data address may specify some data to be acted upon by the worker thread. Alternatively, the relinquish instruction may take only a single operand specifying the address of the worker thread, and the data address could be included in the code of the worker thread; or in another example the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The relinquish instruction ("RUN") acts on the scheduler 24 so as to relinquish the current time slot, in which this instruction is itself executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the relinquish instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the relinquish instruction ("RUN") to allocate this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M−1)).

Further, in some embodiments the RUN and/or RUNALL instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as a floating point rounding mode (e.g. round to nearest or round to zero) and/or an overflow mode (e.g. saturate or use a separate value representing infinity). The copied status or mode then controls the worker in question to operate in accordance with the copied status or mode. In embodiments, the worker can later overwrite this in its own status register (but cannot change the supervisor's status). In further alternative or additional embodiments, the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Once launched, each of the currently allocated worker threads W0 . . . W3 proceeds to perform the one or more computation tasks defined in the code specified by the respective relinquish instruction. At the end of this, the respective worker thread then hands the time slot in which it is running back to the supervisor thread. This is achieved by executing an exit instruction ("EXIT").

The EXIT instruction takes at least one operand and preferably only a single operand, exit_state (e.g. a binary value), to be used for any purpose desired by the programmer to indicate a state of the respective codelet upon ending (e.g. to indicate whether a certain condition was met):

EXIT exit_state

The EXIT instruction acts on the scheduler 24 so that the time slot in which it is executed is returned back to the supervisor thread. The supervisor thread can then perform one or more subsequent supervisor tasks (e.g. barrier synchronization and/or exchange of data with external resources such as other tiles), and/or continue to execute another relinquish instruction to allocate a new worker thread (W4, etc.) to the slot in question. Note again therefore that the total number of threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be assigned to which of the interleaved time slots S0 . . . SM in the round robin schedule of the scheduler 24.

Furthermore, the EXIT instruction is given a further special function, namely to cause the exit state specified in the operand of the EXIT instruction to be automatically aggregated (by dedicated hardware logic) with the exit states of a plurality of other worker threads being run through the same pipeline 13 of the same processor module 4 (e.g. same tile). Thus an extra, implicit facility is included in the instruction for terminating a worker thread.

Figure 5:
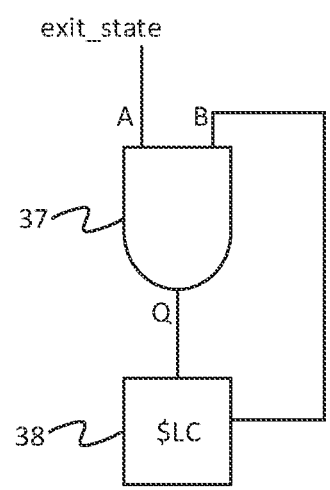
FIG. 5 is a schematic diagram of logic for aggregating exit states of multiple threads, FIG. 6 schematically illustrates synchronization amongst worker threads on the same tile.

An example circuit for achieving this is shown in FIG. 5. In this example, the exit states of the individual threads and the aggregated exit state each take the form of a single bit, i.e. 0 or 1. The processor module 4 comprises a register 38 for storing the aggregated exit state of that processor module 4. This register may be referred to herein as the "local consensus" register $LC (as opposed to a global consensus when the processor module 4 is included as one of an array of similar processor tiles, to be discussed in more detail shortly). In embodiments this local consensus register $LC 38 is one of the supervisor's status registers in the supervisor's context register file CXS. The logic for performing the aggregation comprises an AND gate 37 arranged to perform a logical AND of (A) the exit state specified in the EXIT instructions' operand and (B) the current value in the local consensus register ($LC) 38, and to output the result (Q) back into the local consensus register $LC 38 as a new value of the local aggregate.

At a suitable synchronization point in the program, the value stored in the local consensus register ($LC) 38 is initially reset to a value of 1. I.e. any threads exiting after this point will contribute to the locally aggregated exit state $LC until next reset. The output (Q) of the AND gate 37 is 1 if both inputs (A, B) are 1, but otherwise the output Q goes to 0 if any of the inputs (A, B) is 0. Every time an EXIT instruction is executed its exit state is aggregated with those that have gone before (since last reset). Thus by means of the arrangement shown in FIG. 5, the logic keeps a running aggregate of the exit states of any worker threads which have terminated by means of an EXIT instruction since the last time the local consensus register ($LC) 38 was reset. In this example the running aggregate refers to whether or not all threads so far have exited true: any exit state of 0 from any of the worker threads will mean the aggregate in the register 38 becomes latched to 0 until the next reset.

In embodiments the supervisor SV can read the running aggregate at any time by getting the current value from the local consensus register ($LC) 38 (it does not need to wait for an on-tile synchronization to do so).

The reset of the aggregate in the local consensus register ($LC) 38 may be performed by the supervisor SV performing a PUT to the register address of the local consensus register ($LC) 38 using one or more general purpose instructions, in this example to put a value of 1 to the register 38. Alternatively it is not excluded that the reset could be performed by an automated mechanism, for example triggered by executing the SYNC instruction described later herein.

The aggregation circuitry 37, in this case the AND gate, is implemented in dedicated hardware circuitry in the execution unit of the execution stage 18, using any suitable combination of electronic components for forming the functionality of a Boolean AND. Dedicated circuitry or hardware means circuitry having a hard-wired function, as opposed to being programmed in software using general purpose code. The updating of the local exit state is triggered by the execution of the special EXIT instruction, this being one of the fundamental machine code instructions in the instruction set of the processor module 4, having the inherent functionality of aggregating the exit states. Also, the local aggregate is stored in a control register 38, meaning a dedicated piece of storage (in embodiments a single bit of storage) whose value can be accessed by the code running on the pipeline, but which is not usable by the load-store unit (LSU) to store any general purpose data. Instead, the function of data held in a control register is fixed, in this case to the function of storing the locally aggregated exit state. Preferably the local consensus register ($LC) 38 forms one of the control registers on the processor module 4 (e.g. on tile), whose value the supervisor can access by executing a GET instruction and can be set by executing a PUT instruction.

Note that the circuit shown in FIG. 5 is just one example. An equivalent circuit would be to replace the AND gate 37 with an OR gate and to invert the interpretation of the exit states 0 and 1 in software, i.e. 0→true, 1→false (with the register 38 being reset to 0 rather than 1 at each synchronization point). Equivalently if the AND gate is replaced with an OR gate but the interpretation of the exit states is not inverted, nor the reset value, then the aggregated state in $LC will record whether any (rather than all) the worker states exited with state 1. In other embodiments, the exit states need not be single bits. E.g. the exit state of each individual worker may be a single bit, but the aggregated exit state $LC may comprise two bits representing a trinary state: all workers exited with state 1, all workers exited with state 0, or the workers' exit states were mixed. As an example of the logic for implementing this, one of the two bits encoding the trinary value may be a Boolean AND (or OR) of the individual exit states, and the other bit of the trinary value may be a Boolean OR of the individual exit states. The third encoded case, indicating that the worker's exit states were mixed, can then be formed as the XOR of these two bits.

The exit states can be used to represent whatever the programmer wishes, but one particularly envisaged example is to use an exit state of 1 to indicate that the respective worker thread has exited in a "successful" or "true" state, whilst an exit state of 0 indicates the respective worker thread exited in an "unsuccessful" or "false" state (or vice versa if the aggregation circuitry 37 performs an OR instead of an AND and the register $LC 38 is reset initially to 0). For instance, consider an application where each worker thread performs a computation having an associated condition, such as a condition indicating whether the error(s) in the one or more parameters of a respective node in the graph of a machine intelligence algorithm has/have fallen within an acceptable level according to a predetermined metric. In this case, an individual exit state of one logical level (e.g. 1) may be used to indicate that the condition is satisfied (e.g. the error or errors in the one or more parameters of the node are within an acceptable level according to some metric); whilst an individual exit state of the opposite logical level (e.g. 0) may be used to indicate that the condition was not satisfied (e.g. the error or errors are not within an acceptable level according to the metric in question). The condition may for example be an error threshold placed on a single parameter or each parameter, or could be a more complex function of a plurality of parameters associated with the respective computation performed by the worker thread.

As another more complex example, the individual exit states of the workers and the aggregated exit state may each comprise two or more bits, which may be used, for example, to represent a degree of confidence in the results of the worker threads. E.g. the exit state of each individual worker thread may represent a probabilistic measure of confidence in a result of the respective worker thread, and the aggregation logic 37 may be replaced with more complex circuitry for performing a probabilistic aggregation of the individual confidence levels in hardware.

Whatever meaning is given by the programmer to the exit states, the supervisor thread SV can then get the aggregated value from the local consensus register ($LC) 38 to determine the aggregated exit state of all the worker threads that exited since it was last reset, for example at the last synchronization point, e.g. to determine whether or not all the workers exited in a successful or true state. In dependence on this aggregated value, the supervisor thread may then make a decision in accordance with the programmer's design. The programmer can choose to make whatever use of the locally aggregated exit state that he or she wishes. For example, the supervisor thread may consult the local aggregated exit state in on order to determine whether a certain portion of the program made up of a certain subset of worker threads has completed as expected or desired. If not (e.g. at least one of the worker threads exited in an unsuccessful or false state), it may report to a host processor, or may perform another iteration of the part of the program comprising the same worker threads; but if so (e.g. all the worker threads exited in a successful or true state) it may instead branch to another part of the program comprising one or more new workers.

Preferably the supervisor thread should not access the value in the local consensus register ($LC) 38 until all the worker threads in question have exited, such that the value stored therein represents the correct, up-to-date aggregate state of all the desired threads. Waiting for this may be enforced by a barrier synchronization performed by the supervisor thread to wait all currently-running local worker threads (i.e. those on the same processor module 4, running through the same pipeline 13) to exit. That is, the supervisor thread resets the local consensus register ($LC) 38, launches a plurality of worker threads, and then initiates a local barrier synchronization (local to the processing module 4, local to one tile) in order to wait for all the outstanding worker threads to exit before the supervisor is allowed to proceed to get the aggregated exit state from the local consensus register ($LC) 38.

Figure 6:
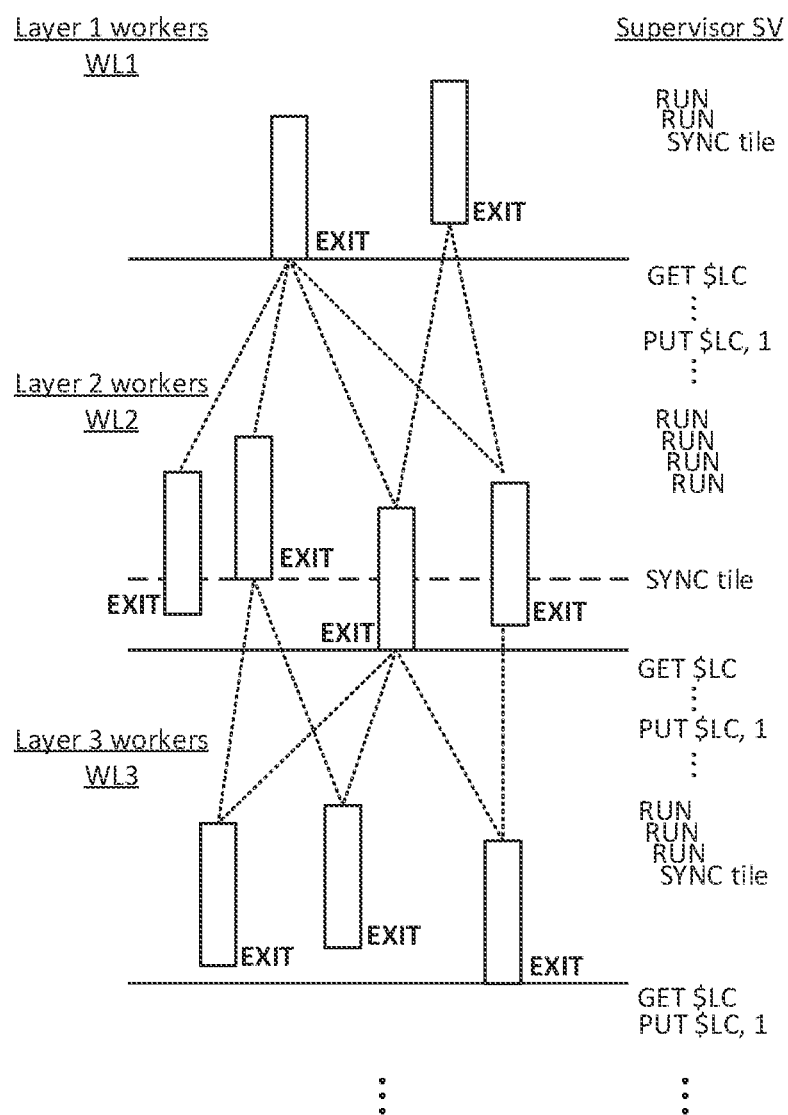

Referring to FIG. 6, in embodiments a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, as the supervisor as part of which the SYNC is executed on (i.e. only threads through the same pipeline 13 of the same barrel-threaded processing unit 10); or whether instead it is to apply across multiple tiles or even across multiple chips.

SYNC mode/mode∈{tile, chip, zone_1, zone_2)

This will be discussed in more detail later but for the purposes of FIG. 6 a local SYNC will be assumed ("SYNC tile", i.e. a synchronization within a single tile).

The workers do not need to be identified as operands of the SYNC instruction, as it is implicit that the supervisor SV is then caused to automatically wait until none of the time slots S0, S1, . . . of the barrel-threaded processing unit 10 is occupied by a worker. As shown in FIG. 6, once each of a current batch of workers WLn have all been launched by the supervisor, the supervisor then executes a SYNC instruction. If the supervisor SV launches workers W in all the slots S0 . . . 3 of the barrel-threaded processing unit 10 (all four in the example illustrated, but that is just one example implementation), then the SYNC will be executed by the supervisor once the first of the current batch of worker threads WLn has exited, thus handing back control of at least one slot to the supervisor SV. Otherwise if the workers do not take up all of the slots, the SYNC will simply be executed immediately after the last thread of the current batch WLn has been launched. Either way, the SYNC causes the supervisor SV to wait for all others of the current batch of workers WLn−1 to execute an EXIT before the supervisor can proceed. Only after this the supervisor executes a GET instruction to get the content of the local consensus register ($LC) 38. This waiting by the supervisor thread is imposed in hardware once the SYNC has been executed. I.e. in response to the opcode of the SYNC instruction, the logic in the execution unit (EXU) of the execution stage 18 causes the fetch stage 14 and scheduler 24 to pause from issuing instructions of the supervisor thread until all outstanding worker threads have executed an EXIT instruction. At some point after getting the value of the local consensus register ($LC) 38 (optionally with some other supervisor code in between), the supervisor executes a PUT instruction to reset the local consensus register ($LC) 38 (in the illustrated example to 1).

As also illustrated in FIG. 6, the SYNC instruction may also be used to place synchronization barriers between different interdependent layers WL1, WL2, WL3, . . . of worker threads, where one or more threads in each successive layer is dependent on data output by one or more worker threads in its preceding layer. The local SYNC executed by the supervisor thread ensures that none of the worker threads in the next layer WLn+1 executes until all the worker threads in the immediately preceding layer WLn have exited (by executing an EXIT instruction).

As mentioned, in embodiments the processor module 4 may be implemented as one of an array of interconnected tiles forming a multi-tile processor, wherein each of tile may be configured as described above in relation to FIGS. 1 to 6.

Figure 7:
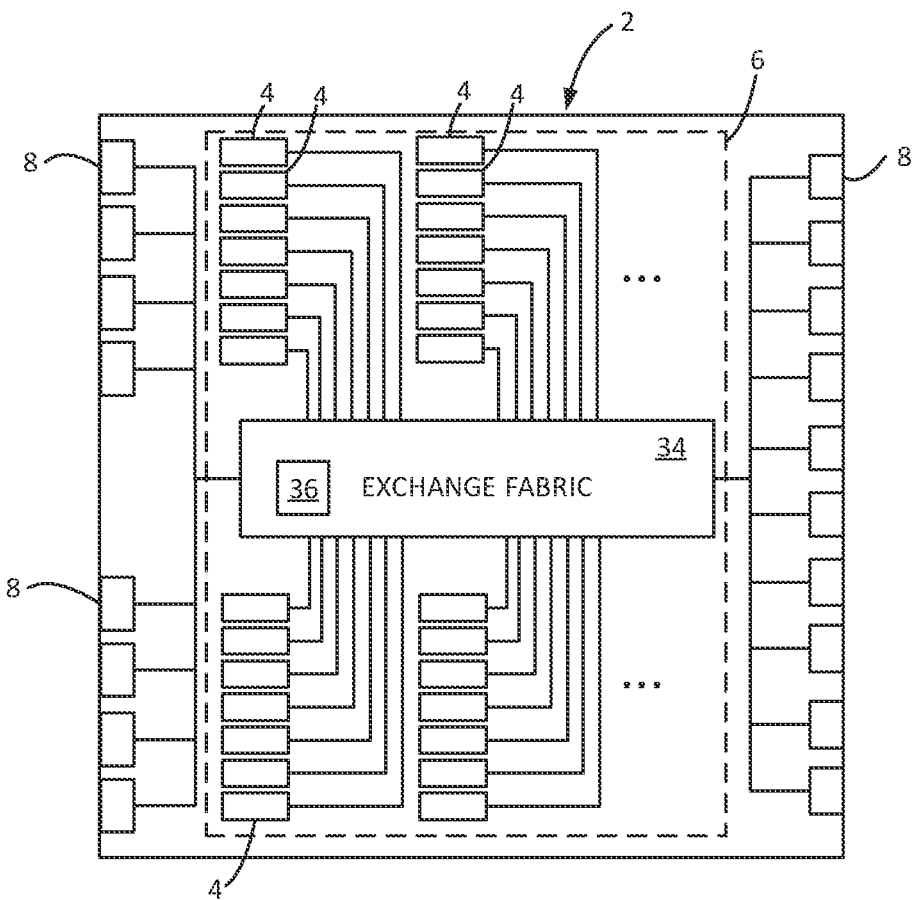
FIG. 7 is a schematic block diagram of a processor chip comprising multiple tiles.

This is illustrated further in FIG. 7 which shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 comprises a respective instance of the barrel-threaded processing unit 10 and memory 11, each arranged as described above in relation to FIGS. 1 to 6. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

In embodiments each chip 2 also comprises one or more external links 8, enabling the chip-2 to be connected to one or more other, external processors on different chips (e.g. one or more other instances of the same chip 2). These external links 8 may comprise any one or more of: one or more chip-to-host links for connecting the chip 2 to a host processor, and/or one or more chip-to-chip links for connecting together with one or more other instances of the chip 2 on the same IC package or card, or on different cards. In one example arrangement, the chip 2 receives work from a host processor (not shown) which is connected to the chip via one of the chip-to-host links in the form of input data to be processed by the chip 2. Multiple instances of the chip 2 can be connected together into cards by chip-to-chip links. Thus a host may access a computer which is architected as a single chip processor 2 or as multiple single chip processors 2 possibly arranged on multiple interconnected cards, depending on the workload required for the host application.

The interconnect 34 is configured to enable the different processor tiles 4 in the array 6 to communicate with one another on-chip 2. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

Figure 8:
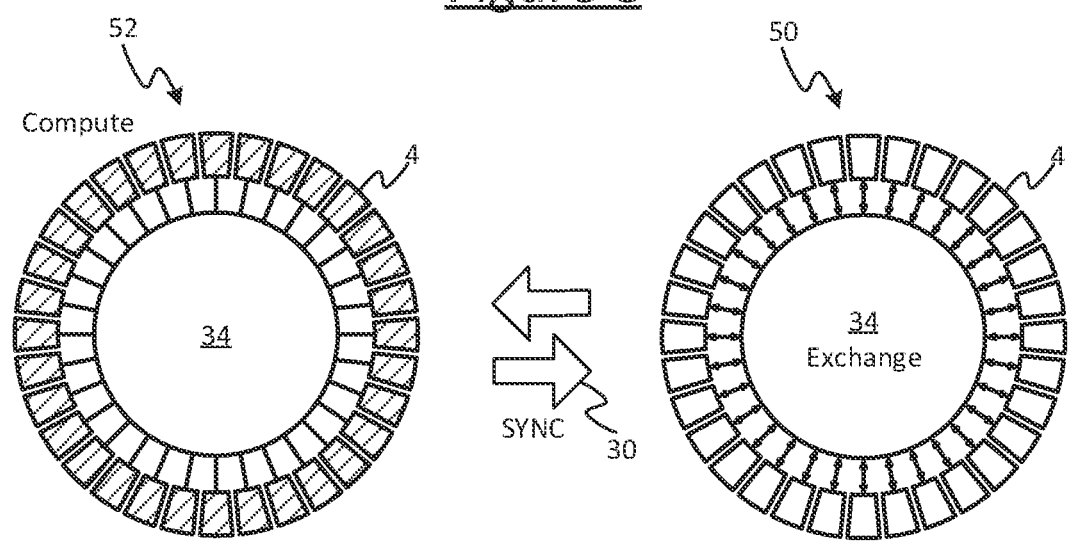
FIG. 8 is a schematic illustration of a bulk synchronous parallel (BSP) computing model.
Figure 9:
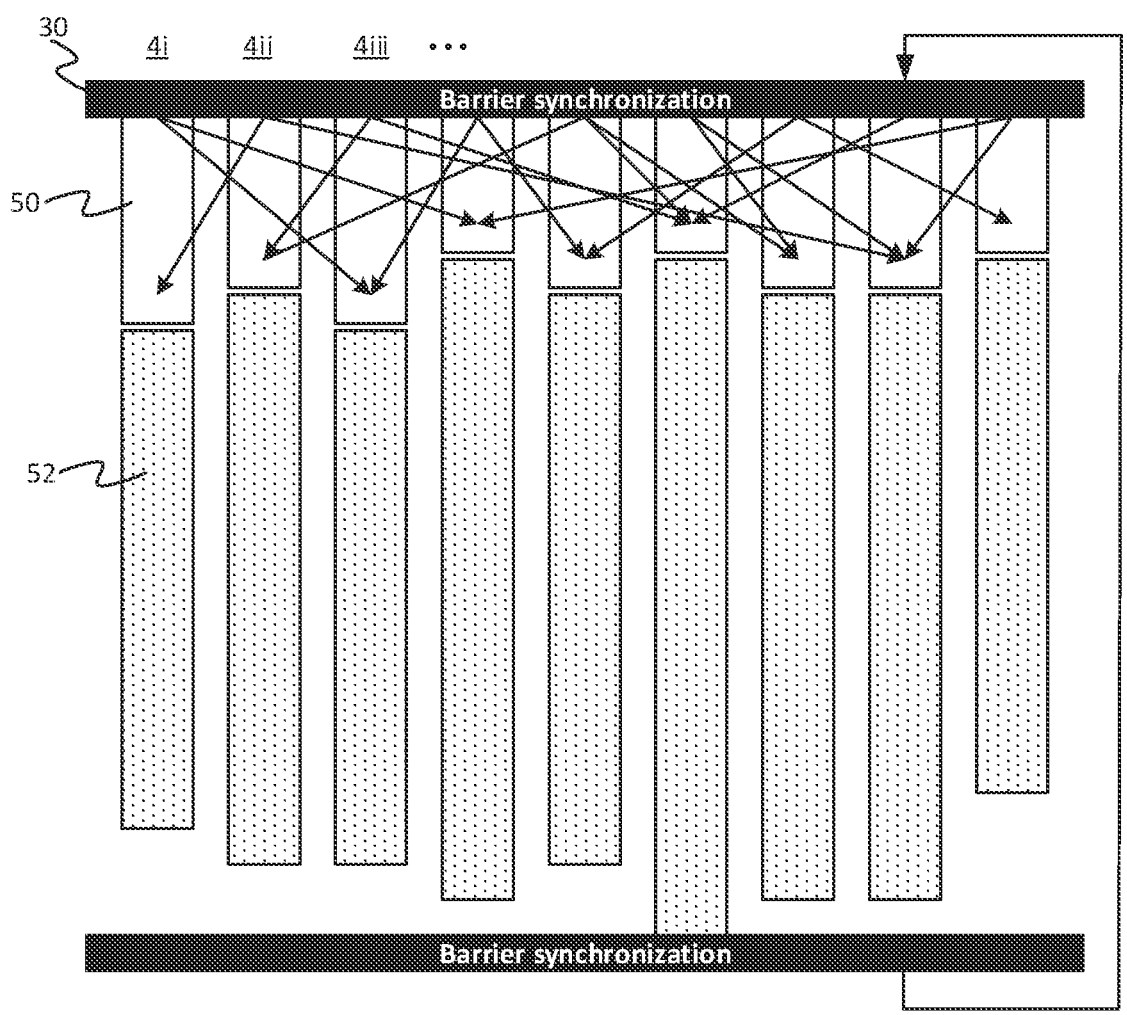
FIG. 9 is another schematic illustration of a BSP model.

This may be achieved by implementing a bulk synchronous parallel (BSP) exchange scheme, as illustrated schematically in FIGS. 8 and 9.

According to one version of BSP, each tile 4 performs a compute phase 52 and an exchange phase 50 in an alternating cycle, separated from one to the other by a barrier synchronization 30 between tiles. In the case illustrated a barrier synchronization is placed between each compute phase 52 and the following exchange phase 50. During the compute phase 52 each tile 4 performs one or more computation tasks locally on-tile, but does not communicate any results of these computations with any others of the tiles 4. In the exchange phase 50 each tile 4 is allowed to exchange one or more results of the computations from the preceding compute phase to and/or from one or more others of the tiles in the group, but does not perform any new computations until it has received from other tiles 4 any data on which its task(s) has/have dependency. Neither does it send to any other tile any data except that computed in the preceding compute phase. It is not excluded that other operations such as internal control-related operations may be performed in the exchange phase. In embodiments the exchange phase 50 does not include any non-time-deterministic computations, but a small number of time-deterministic computations may optionally be allowed during the exchange phase 50. Note also that a tile 4 performing computation may be allowed during the compute phase 52 to communicate with other external system resources external to the array of tiles 4 being synchronized—e.g. a network card, disk drive, or field programmable gate array (FPGA)—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phases 52 into the exchange phase 50, or the juncture transitioning from the exchange phases 50 into the compute phase 52, or both. That is to say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. In all three variants it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same chip 2 or different chips could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 9 illustrates the BSP principle as implemented amongst a group 4i, 4ii, 4iii of some or all of the tiles in the array 6, in the case which imposes: (a) a barrier synchronization from compute phase 52 to exchange phase 50 (see above). Note that in this arrangement, some tiles 4 are allowed to begin computing 52 whilst some others are still exchanging.

According to embodiments disclosed herein, this type of BSP may be facilitated by incorporating additional, special, dedicated functionality into a machine code instruction for performing barrier synchronization, i.e. the SYNC instruction.

In embodiments, the SYNC function takes this functionality when qualified by an inter-tile mode as an operand, e.g. the on-chip mode: SYNC chip.

Figure 10:
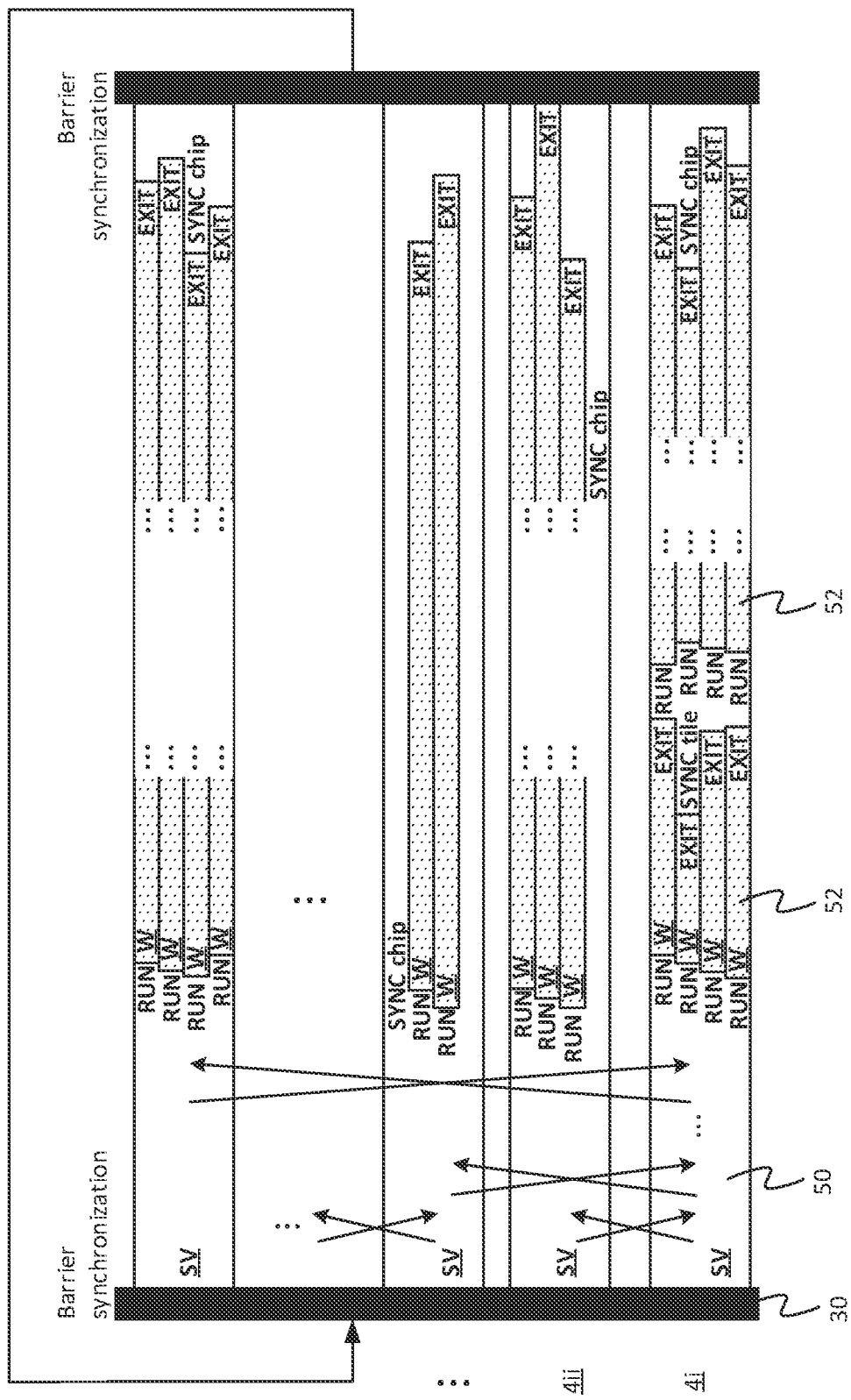
FIG. 10 is a schematic illustration of BSP between multi-threaded processing units.

This is illustrated schematically in FIG. 10. In the case where each tile 4 comprises a multi-threaded processing unit 10, then each tile's compute phase 52 may in fact comprise tasks performed by multiple worker threads W on the same tile 4 (and a given compute phase 52 on a given tile 4 may comprise one or more layers WL of worker threads, which in the case of multiple layers may be separated by internal barrier synchronizations using the SYNC instruction with the local on-tile mode as an operand, as described previously). Once the supervisor thread SV on a given tile 4 has launched the last worker thread in the current BSP superstep, the supervisor on that tile 4 then executes a SYNC instruction with the inter-tile mode set as the operand: SYNC chip. If the supervisor is to launch (RUN) worker threads in all the slots of its respective processing unit 10, the "SYNC chip" is executed as soon as the first slot that is no longer needed to RUN any more workers in the current BSP superstep is handed back to the supervisor. E.g. this may occur after the first thread to EXIT in the last layer WL, or simply after the first worker thread to EXIT if there is only a single layer. Otherwise if not all the slots are to be used for running workers in the current BSP superstep, the "SYNC chip" can be executed as soon as the last worker that needs to be RUN in the current BSP superstep has been launched. This may occur once all the workers in the last layer have been RUN, or simply once all the worker threads have been RUN if there is only one layer.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep. I.e. after all tiles 4 on the chip 2 have passed the barrier, the cross-tile program as a whole can progress to the next exchange phase 50.

Figure 11:
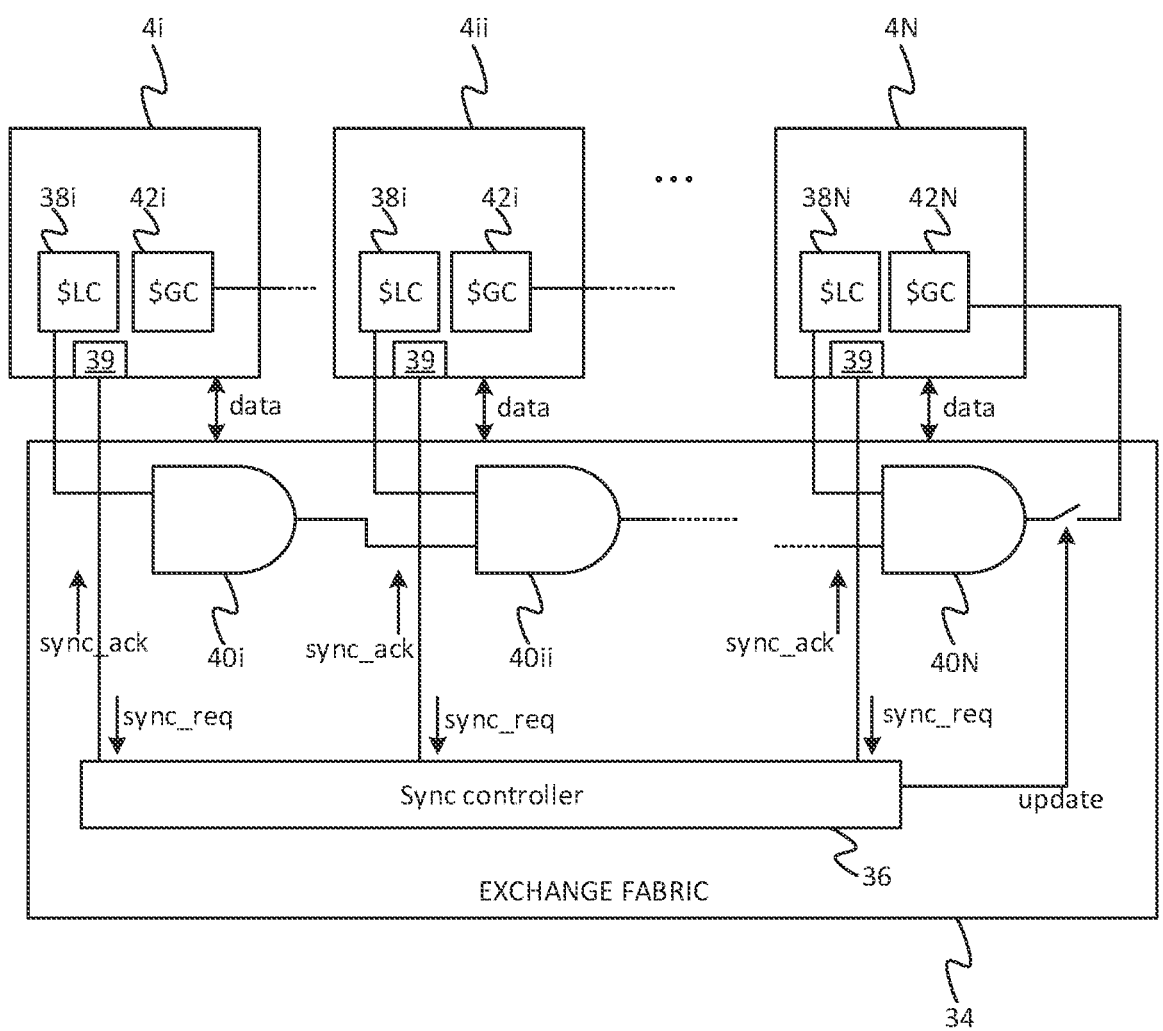
FIG. 11 is a schematic block diagram of an interconnect system.

FIG. 11 gives a schematic diagram illustrating the logic trigged by a "SYNC chip" according to embodiments disclosed herein.

Once the supervisor has launched (RUN) all of the threads it intends to in the current compute cycle 52, it then executes a SYNC instruction with the on-chip, inter-tile operand: SYNC chip. This triggers the following functionality to be triggered in dedicated synchronization logic 39 on the tile 4, and in a synchronization controller 36 implemented in the hardware interconnect 34. This functionality of both the on-tile sync logic 39 and the synchronization controller 36 in the interconnect 34 is implemented in dedicated hardware circuitry such that, once the SYNC chip is executed, the rest of the functionality proceeds without further instructions being executed to do so.

Firstly, the on-tile sync logic 39 causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic 39 automatically sends a synchronization request "sync_req" to the synchronization controller 36 in the interconnect 34. The local tile 4 then continues to wait with the supervisor instruction issue paused. A similar process is also implemented on each of the other tiles 4 in the array 6 (each comprising its own instance of the sync logic 39). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 on the same chip 2, the synchronization controller 36 sends a synchronization acknowledgement signal "sync_ack" back to the sync logic 39 on each of the tiles 4. Up until this point, each of the tiles 4 has had its supervisor instruction issue paused waiting for the synchronization acknowledgment signal (sync_ack). Upon receiving the sync_ack signal, the sync logic 39 in the tile 4 automatically unpauses the supervisor instruction issue for the respective supervisor thread on that tile 4. The supervisor is then free to proceed with exchanging data with other tiles 4 via the interconnect 34 in a subsequent exchange phase 50.

Preferably the sync_req and sync_ack signals are transmitted and received to and from the synchronization controller, respectively, via one or more dedicated sync wires connecting each tile 4 to the synchronization controller 36 in the interconnect 34.

Furthermore, in accordance with embodiments disclosed herein, an additional functionality is included in the SYNC instruction. That is, at least when executed in an inter-tile mode (e.g. SYNC chip), the SYNC instruction also causes the local exit states $LC of each of the synchronized tiles 4 to be automatically aggregated in further dedicated hardware 40 in the interconnect 34. In the embodiments shown this logic takes the form of a multi-input AND gate (one input for each tile 4 in the array 6), e.g. formed from a string of two-input AND gates 40i, 40ii, . . . as shown by way of example in FIG. 11. This inter-tile aggregation logic receives the value in the local exit state register (local consensus register) $LC 38 from each tile 4 in the array—in embodiments each a single bit—and aggregates them into a single value, e.g. an AND of all the locally aggregated exit states. Thus the logic forms a globally aggregated exit state across all the threads on all tiles 4 in the array 6.

Each of the tiles 4 comprises a respective instance of a global consensus register ($GC) 42 arranged to receive and store the global exit state from the global aggregation logic 40 in the interconnect 34. In embodiments this is another of the status registers in the supervisor's context register file CXS. In response to the synchronization request (sync_req) being received from all of the tiles 4 in the array 6, the synchronization controller 36 causes the output of the aggregation logic 40 (e.g. the output of the AND) to be stored in the global consensus register ($GC) 42 on each tile 4 (it will be appreciated that the "switch" shown in FIG. 11 is a schematic representation of the functionality and in fact the updating may be implemented by any suitable digital logic). This register $GC 42 is accessible by the supervisor thread SV on the respective tile 4 once the supervisor instruction issue is resumed. In embodiments the global consensus register $GC is implemented as a control register in the control register file such that the supervisor thread can get the value in the global consensus register ($GC) 42 by means of a GET instruction. Note that the synchronization logic 36 waits until the sync_req is received from all tiles 4 before updating the value in any of the global consensus registers ($GC) 42, otherwise an incorrect value may be made accessible to a supervisor thread on a tile that has not yet completed its part of the compute phase 52 and is therefore still running.

The globally aggregated exit state $GC enables the program to determine an overall outcome of parts of the program running on multiple different tiles 4 without having to individually examine the state of each individual worker thread on each individual tile. It can be used for any purpose desired by the programmer. For instance, in the example shown in FIG. 11 where the global aggregate is a Boolean AND, this means that any input being 0 results in an aggregate of 0, but if all the inputs are 1 then the aggregate is 1. I.e. if a 1 is used to represent a true or successful outcome, this means that if any of the local exit states of any of the tiles 4 is false or unsuccessful, then the global aggregated state will also be false or represent an unsuccessful outcome. E.g. this could be used to determine whether or not the parts of the code running on all the tiles have all satisfied a predetermined condition. Thus, the program can query a single register (in embodiments a single bit) to ask "did anything go wrong? Yes or no?" or "have all nodes in the graph reached an acceptable level of error? Yes or no?, rather than having to examine the individual states of the individual worker threads on each individual tile (and again, in embodiments the supervisor is in fact not able to query the state of the workers except through the exit state registers 38, 42). In other words, the EXIT and SYNC instructions each reduce multiple individual exit states into a single combined state.

In one example use case, the supervisor on one or more of the tiles may report to a host processor if the global aggregate indicated a false or unsuccessful outcome. As another example, the program may perform a branch decision depending on the global exit state.

For example, the program examines the global aggregate exit state $GC and based on this determines whether to continue looping or whether to branch elsewhere. If the global exit state $GC is still false or unsuccessful, the program continues iterating the same, first part of the program, but once the global exit state $GC is true or successful, the program branches to a second, different part of the program. The branch decision may be implemented individually in each supervisor thread, or by one of the supervisors taking on the role of master and instructing the other, slave supervisors on the other tiles (the master role being configured in software).

Note that the aggregation logic 40 shown in FIG. 11 is just one example. In another equivalent example, the AND may be replaced with an OR, and the interpretation of 0 and 1 may be inverted (0→true, 1→false). Equivalently if the AND gate is replaced with an OR but the interpretation of the exit states is not inverted, nor the reset value, then the aggregated state in $GC will record whether any (rather than all) the tiles exited with locally aggregated state 1. In another example, the global exit state $GC may comprise two bits representing a trinary state: all tiles' locally aggregated exit states $LC were state 1, all tiles' locally aggregated exit states $LC were state 0, or the tiles' locally aggregated exit states $LC were mixed. As another more complex example, the local exit states of the tiles 4 and the globally aggregated exit state may each comprise two or more bits, which may be used, for example, to represent a degree of confidence in the results of the tiles 4. E.g. the locally aggregated exit state $LC of each individual tile may represent a statistical, probabilistic measure of confidence in a result of the respective tile 4, and the global aggregation logic 40 may be replaced with more complex circuitry for performing a statistical aggregation of the individual confidence levels in hardware.

Figure 12:
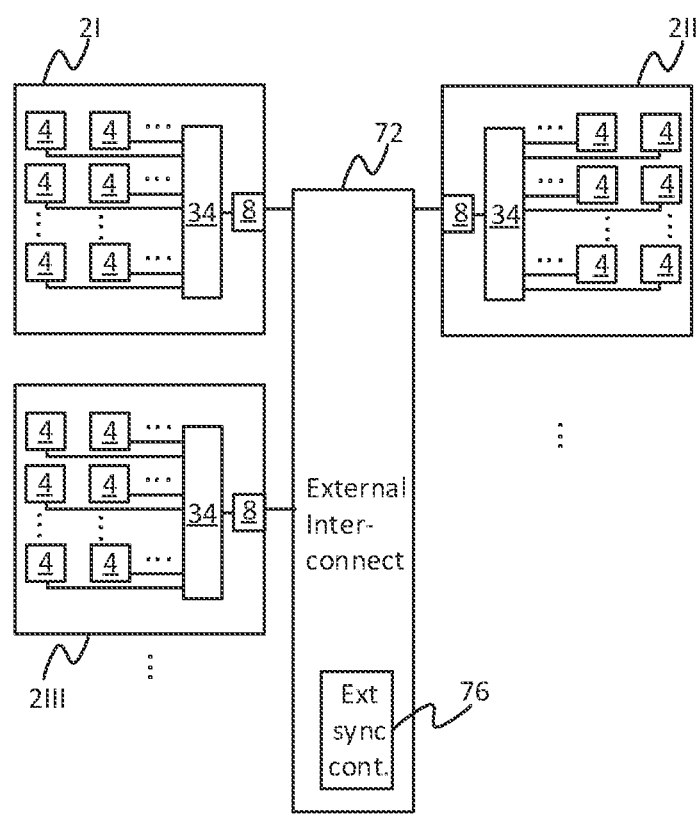
FIG. 12 is a schematic illustration of system of multiple interconnected processor chips.

As mentioned previously, in embodiments multiple instances of the chip 2 can be connected together to form an even larger array of tiles 4 spanning multiple chips 2. This is illustrated in FIG. 12. Some or all of the chips 2 may be implemented on the same IC package or some or all of the chips 2 may be implemented on different IC packages. The chips 2 are connected together by an external interconnect 72 (via the external links 8 shown in FIG. 7).

This may connect between chips 2 on the same IC package, different IC packages on the same card, and/or different IC packages on different cards. As well as providing a conduit for exchange of data between tiles 4 on different chips, the external interconnect 72 also provides hardware support for performing barrier synchronization between the tiles 4 on different chips 2 and aggregating the local exit states of the tiles 4 on the different chips 2.

In embodiments, the SYNC instruction can take at least one further possible value of its mode operand to specify an external, i.e. inter-chip, synchronization: SYNC zone_n, wherein zone_n represents an external sync zone. The external interconnect 72 comprises similar hardware logic to that described in relation to FIG. 11, but on an external, inter-chip scale.

When the SYNC instruction is executed with an external sync zone of two or more chips 2 specified in its operand, this causes the logic in the external interconnect 72 to operate in a similar manner to that described in relation to the internal interconnect 34, but across the tiles 4 on the multiple different chips 2 in the specified sync zone.

That is, in response to the opcode of the SYNC instruction whose operand specifies an external sync, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst all the external tiles 4 to which, e.g. all the tiles across all chips 2 in the system for a global sync. I.e. the sync logic 76 in the external interconnect 72 will return the sync acknowledgment signal (sync_ack) to the tiles 4 across chips 2 only once a synchronization request (sync_req) has been received from all the tiles 4 from those chips. All the tiles 4 on all those chips 2 will be automatically paused until the sync acknowledgment (sync_ack) from the external sync logic 76 is returned.

Thus, in response to an external SYNC, the supervisor instruction issue is paused until all tiles 4 on all chips 2 in the external sync zone have completed their compute phase 52 and submitted a sync request. Further, logic in the external interconnect 72 aggregates the local exit states of all these tiles 4, across the multiple chips 2 in the zone in question. Once all tiles 4 in the external sync zone have made the sync request, the external interconnect 72 signals a sync acknowledgment back to the tiles 4 and stores the cross-chip global aggregate exit state into the global consensus registers ($GC) 42 of all the tiles 4 in question. In response to the sync acknowledgement, the tiles 4 on all the chips 2 in the zone resume instruction issue for the supervisor.

Note that in embodiments the functionality of the interconnect 72 may be implemented in the chips 2, i.e. the logic may be distributed among the chips 2 such that only wired connections between chips are required (FIGS. 11 and 12 are schematic).

All tiles 4 within the mentioned sync zone are programmed to indicate the same sync zone via the mode operand of their respective SYNC instructions. In embodiments the sync logic 76 in the external interconnect 72 peripheral is configured such that, if this is not the case due to a programming error or other error (such as a memory parity error), then some or all tiles 4 will not receive an acknowledgement, and therefore that the system will come to a halt at the next external barrier, thus allowing a managing external CPU (e.g. the host) to intervene for debug or system recovery. Preferably however the compiler is configured to ensure the tiles in the same zone all indicate the same, correct sync zone at the relevant time. The sync logic may also be configured to take other alternative or additional measures in event of inconsistency in the modes indicated by the different SYNC instruction, e.g. raising an exception to the external CPU, and/or halting execution by some other mechanism.

Figure 14:
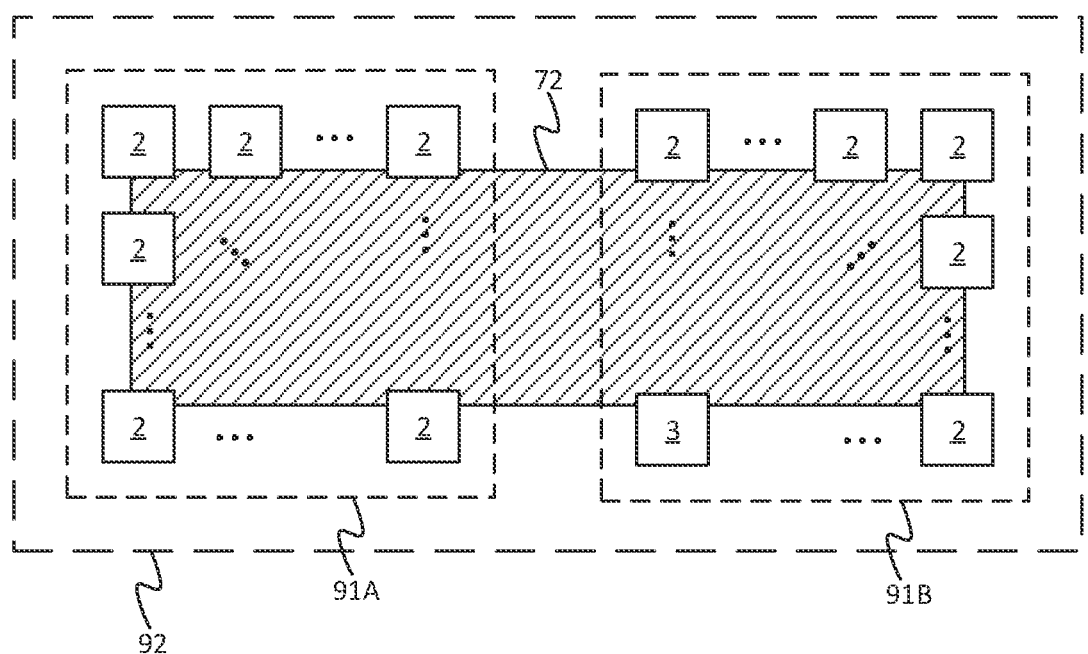
FIG. 14 is another schematic illustration of a system of multiple processor chips.

As illustrated in FIG. 14, in embodiments the mode of the SYNC instruction can be used to specify one of multiple different possible external sync zones, e.g. zone_1 or zone_2. In embodiments these correspond to different hierarchical levels. That is to say, each higher hierarchical level 92 (e.g. zone 2) encompasses two or more zones 91A, 91B of at least one lower hierarchical level. In embodiments there are just two hierarchical levels, but higher numbers of nested levels are not excluded. If the operand of the SYNC instruction is set to the lower hierarchical level of external sync zone (SYNC zone_1), then the above-described sync and aggregation operations are performed in relation to the tiles 4 on the chips 2 in only the same lower-level external sync zone as the tile on which the SYNC was executed. If on the other hand the operand of the SYNC instruction is set to the higher hierarchical level of external sync zone (SYNC zone_2), then the above-described sync and aggregation operations are automatically performed in relation to all the tiles 4 on all the chips 2 in the same higher-level external sync zone as the tile on which the SYNC was executed.

In response to the opcode of the SYNC instruction having an external sync zone as an operand, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst the tiles 4 of the signalled group. I.e. the sync logic 76 in the external interconnect 72 will return the sync acknowledgment signal (sync_ack) to the tiles in the signalled sync zone only once a synchronization request (sync_req) has been received from all the tiles 4 in that zone (but will not wait for any other tiles outside that zone if it is not a global sync).

Note that in other embodiments, the sync zones that can be specified by the mode of the SYNC instruction are not limited to being hierarchical in nature. In general, a SYNC instruction may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

Figure 18:
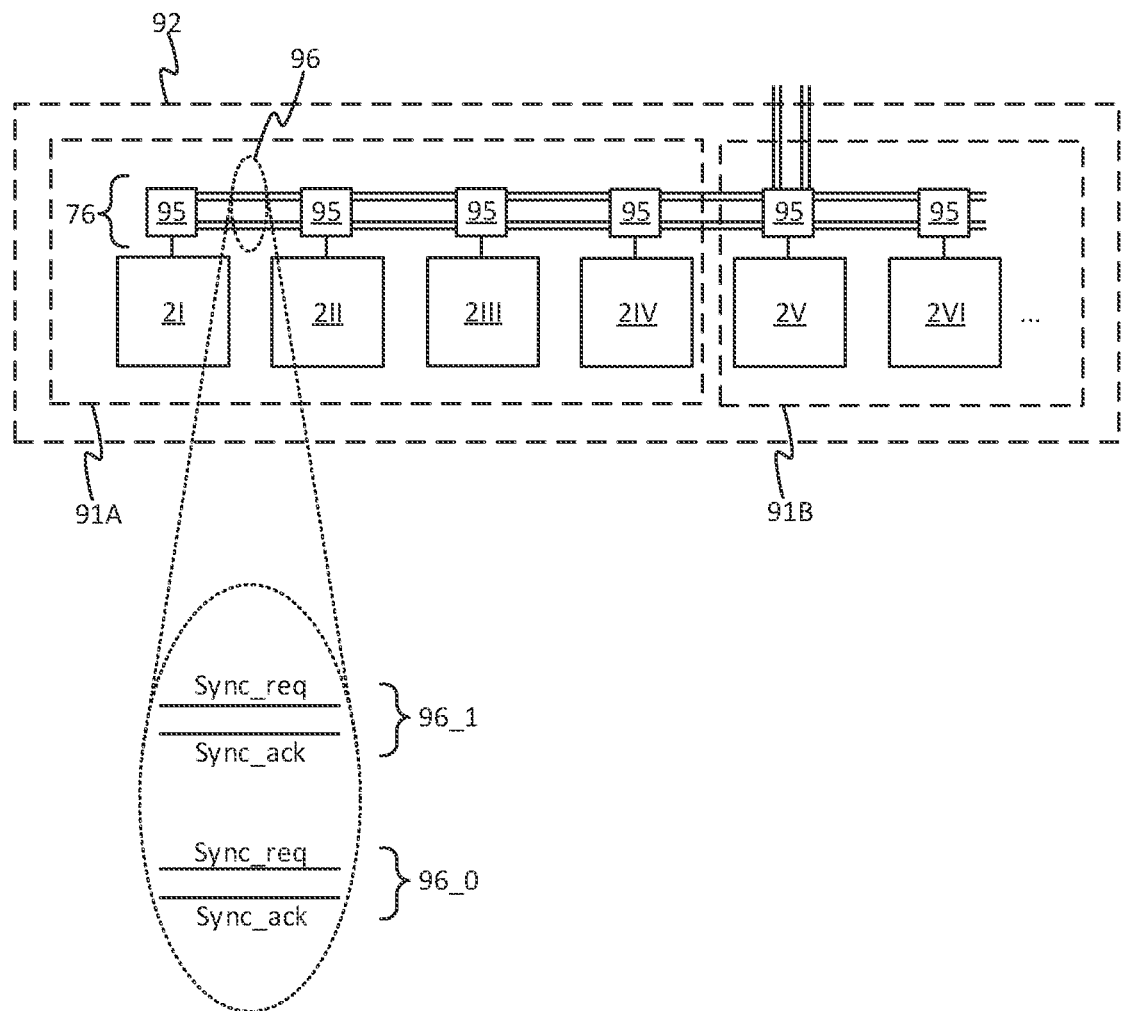
FIG. 18 illustrates example wiring for synchronizing between chips, and FIG. 19 schematically illustrates an external flow control mechanism for exchange between chips.

An example mechanism for implementing the synchronization amongst the selected sync group 91, 92 is illustrated in FIG. 18. As illustrated, the external sync logic 76 in the external interconnect 72 comprises a respective sync block 95 associated with each respective chip 2. Each sync block 95 comprises respective gating logic and a respective sync aggregator. The gating logic comprises hardware circuitry which connects together the chips 2 in a daisy chain topology for the purpose of synchronization and exit state aggregation, and which propagates the sync and exit state information in accordance with the following. The sync aggregator comprises hardware circuitry configured to aggregate the synchronization requests (sync_req) and the exit states in accordance with the following.

The respective sync block 95 associated with each chip 2 is connected to its respective chip 2, such that it can detect the sync request (Sync_req) raised by that chip 2 and the exit state of that chip 2, and so that it can return the sync acknowledgment (Sync_ack) and global exit state to the respective chip 2. The respective sync block 95 associated with each chip 2 is also connected to the sync block 95 of at least one other of the chips 2 via an external sync interface comprising a bundle of four sync wires 96, details of which will be discussed in more detailed shortly. This may be part of one of the chip-to-chip links 8. In the case of a link between chips on different cards, the interface 8 may for example comprise a PCI interface and the four sync wires 96 may be implemented by re-using four wires of the PCI interface. Some of the chips' sync blocks 95 are connected to that of two adjacent chips 2, each connection via a respective instance of the four sync wires 96. This way, the chips 2 can be connected in one or more daisy chains via their sync blocks 95. This enables the sync requests, sync acknowledgments, running aggregates of exit states, and global exit states, to be propagated up and down the chain.

In operation, for each sync group 91, 92, the sync block 95 associated with one of the chips 2 in that group is set as the master for synchronization and exit state aggregation purposes, the rest in the group being slaves for this purpose. Each of the slave sync blocks 95 is configured with the direction (e.g. left or right) that it needs to propagate sync requests, sync acknowledgments and exit states for each sync group 91, 92 (i.e. the direction toward the master). In embodiments these settings are configurable by software, e.g. in an initial configuration phase after which the configuration remains set throughout the subsequent operation of the system. For instance this may be configured by the host processor. Alternatively it is not excluded that the configuration could be hard-wired. Either way, the different sync groups 91, 92 can have different masters and in general it is possible for a given chip 2 (or rather its sync block 95) to be master of one group and not another group of which it is a member, or to be master of multiple groups.

For instance, by way of illustration consider the example scenario of FIG. 18. Say for the sake of example that the sync block 95 of chip 2IV is set as the master of a given sync group 91A. Consider now the first chip 2I in the chain of chips 2, connected via their sync blocks 95 and wires 96 ultimately to chip 2IV. When all the worker threads of the current compute phase on the first chip 2I have executed an EXIT instruction, and the supervisors on all the (participating) tiles 4 have all executed a SYNC instruction specifying the sync group 91A, then the first chip 2I signals its sync readiness to its respective associated sync block 95. The chip 2I also outputs to its respective sync block 95 its chip-level aggregated exit state (the aggregate of all the exiting workers on all the participating tiles on the respective chip 2I). In response, the sync block 95 of the first chip 2I propagates a sync request (Sync_req) to the sync block 95 of the next chip 2II in the chain. It also propagates the exit state of the first chip 2I to the sync block 95 of this next chip 2II. The sync block 95 of this second chip 2II waits until the supervisors of its own (participating) tiles 4 have all executed a SYNC instruction specifying the sync group 91A, causing the second chip 2II to signal sync readiness. Only then does the second chip's sync block 95 propagate a sync request to the sync block 95 of the next (third) chip 2III in the chain, and also propagates a running aggregate of the exit state of the first chip 2I with that of the second 2II. If the second chip 2II had become sync ready before the first 2I, then the sync block 95 of the second chip 2II would have waited for the first chip 2I to signal a sync request before propagating the sync request to the sync block 95 of the third chip 2III. The sync block 95 of the third chip 2III behaves in a similar manner, this time aggregating the running aggregate exit state from the second chip 2II to obtain the next running aggregate to pass onwards, etc. This continues toward the master sync block, that of chip 2IV in this example.

The sync block 95 of the master then determines a global aggregate of all the exit states based on the running aggregate it receives and the exit state of its own chip 2IV. It propagates this global aggregate back out along the chain to all the chips 2, along with the sync acknowledgement (Sync_ack).

If the master is part way along a chain, as opposed to being at one end as in the above example, then the sync and exit state information propagates in opposite directions either side of the master, both sides toward the master. In this case the master only issues the sync acknowledgment and global exit state once the sync request from both sides has been received. E.g. consider the case where chip 2III is master of group 92. Further, in embodiments the sync block 95 of some of the chips 2 could connect to that of three or more other chips 2, thus creating multiple branches of chains toward the master. Each chain then behaves as described above, and the master only issues the sync acknowledgment and global exit state once the sync request from all chains has been received. And/or, one or more of the chips 2 could connect to an external resource such as the host processor, a network card, a storage device or an FPGA.

In embodiments the signalling of the sync and exit state information is implemented as follows. The bundle of four sync wires 96 between each pair of chips 2 comprises two pairs of wires, a first pair 960 and a second pair 96_1. Each pair comprises an instance of a sync request wire and an instance of a sync acknowledgment wire. To signal a running aggregate exit state of value 0, the sync block 95 of the sending chip 2 uses the sync request wire of the first wire pair 96_0 when signalling the sync request (sync_req), or to signal a running aggregate of value 1 the sync block 95 uses the sync request wire of the second wire pair 96_1 when signalling the sync request. To signal a global aggregate exit state of value 0, the sync block 95 of the sending chip 2 uses the sync acknowledgment wire of the first wire pair 96_0 when signalling the sync acknowledgment (sync_ack), or to signal a global aggregate of value 1 the sync block 95 uses the sync request wire of the second wire pair 96_1 when signalling the sync acknowledgment.

Note that the above is only the mechanism for propagating sync and exit state information. The actual data (content) is transmitted by another channel, for example as discussed later with reference to FIG. 19. Further, it will be appreciated that this is only one example implementation, and the skilled person will be capable of building other circuits for implementing the disclosed synchronization and aggregation functionality once given the specification of that functionality disclosed herein. For instance, the synchronisation logic (95 in FIG. 18) could instead use packets carried over the interconnect 34, 72 as an alternative to dedicated wiring. E.g. the sync_req and/or the sync_ack could each be transmitted in the form of one or more packets.

As mentioned previously, not all tiles 4 need necessarily participate in the synchronization. In embodiments, as discussed, the group of participating tiles can be set by the mode operand of the sync instruction. However, this only allows for selection of predefined groups of tiles. It is recognized herein that it would also be desirable to be able to select sync participation on a tile-by-tile basis. Therefore in embodiments, there is provided an alternative or additional mechanism for selecting which individual tiles 4 participate in the barrier synchronization.

Particularly, this is achieved by providing an additional type of instruction in the processor instruction set, to be executed by one or some tiles 4 in place of the SYNC instruction. This instruction may be referred to as the "abstain" instruction, or "SANS" instruction (start automatic non-participatory sync). In embodiments the SANS is reserved for use by the supervisor thread. In embodiments it takes a single immediate operand:

SANS n_barriers

The behaviour of the SANS instruction is to cause the tile on which it is executed to abstain from the current barrier synchronization, but without holding up the other tiles which are waiting for all tiles in the specified sync group to SYNC. In effect it says "go on without me". When the SANS instruction is executed, the opcode of the SANS instruction triggers the logic in the execution unit of the execution stage 18 to send an instance of the synchronization request signal (Sync_req) to the internal and/or external sync controller 36, 76 (depending on the mode). In embodiments, the sync request generated by the SANS applies to any sync group 91, 92 that encompass the tile 4 that executed the SANS. I.e. for whatever sync group the tiles 4 in this local chip or chips are using next (they must agree on the sync group), the sync_req from those that have executed SANS will always be valid.

Thus from the perspective of the sync controller logic 36, 76 and the other tiles 4 in the sync group, the tile 4 executing the SANS instruction appears exactly as a tile 4 executing a SYNC instruction, and does not hold up the sync barrier and the sending of the sync acknowledgment signal (Sync_ack) from the sync logic 36, 76. I.e. the tiles 4 executing the SANS instead of the SYNC does not hold up or stall any of the other tiles 4 involved any sync group of which the tile in question is otherwise a member. Any handshake performed by a SANS is valid for all sync groups 91, 92.

However, unlike the SYNC instruction, the SANS instruction does not cause supervisor instruction issue to be paused awaiting the sync acknowledgment signal (Sync_ack) from the sync logic 36, 76. Instead the respective tile can simply continue uninhibited by the current barrier synchronization that is being conducted between the other tiles 4 that executed SYNC instructions. Thus by mimicking a sync but not waiting, the SANS instruction allows its tile 4 to press on with processing one or more tasks whilst still allowing the other tiles 4 to sync.

The operand n_barriers specifies the number of "posted" syncs, i.e. the number of future sync points (barriers) the tile will not be participating in. Alternatively it is not excluded that in other embodiments the SANS instruction does not take this operand, and instead each execution of the SANS instruction causes only a one-off abstention.

By means of the SANS instruction, certain tiles 4 may be responsible for performing tasks outside the direct scope of the BSP operating schedule. For example, it may be desirable to allocate a small number of tiles 4 within a chip 2 to initiate (and process) data transfers to and/or from host memory while the majority of tiles 4 are occupied with the primary computation task(s). In such scenarios those tiles 4 not directly involved with primary computation can declare themselves as effectively disconnected from the synchronization mechanism for a period of time using the automatic non-participatory sync feature (SANS). When using this feature, a tile 4 is not required to actively (i.e. via execution of the SYNC instruction) signal its readiness for synchronization (for any of the synchronization zones), and in embodiments makes a null contribution to the aggregated exit status.

The SANS instruction begins or extends a period during which the tile 4 on which it is executed will abstain from active participation in inter-tile synchronization (or synchronization with other external resources if they are also involved in the synchronization). During this period, this tile 4 will automatically signal its readiness for synchronization, within all zones, and in embodiments also make a null contribution to the global aggregated consensus $GC. This time period may be expressed as an unsigned immediate operand (n_barriers) indicating how many additional future synchronization points will be automatically signalled by this tile 4. Upon execution of the SANS, the value n_barriers specified by its operand is placed into a countdown register $ANS_DCOUNT on the respective tile 4. This is a piece of architectural state used to keep a track of how many additional future sync_reqs should be made. If the automatic non-participatory sync mechanism is currently inactive, the first assertion of readiness (sync request, sync_req) will be performed immediately. Subsequent assertions will occur in the background, once the previous synchronization has completed (i.e. following assertion of the sync acknowledgment, sync_ack). If the automatic non-participatory sync mechanism is currently active, the countdown counter register $ANS_DCOUNT will be updated in an automatic manner, such that no sync acknowledgment signal is left unaccounted for. The automatic non-participatory sync mechanism is implemented in dedicated hardware logic, preferably an instance of it in each tile 4, though in other embodiments it is not excluded that it could instead be implemented centrally for a group of tiles or all tiles.

With regard to the exit state behaviour, there are in fact a number of possibilities depending on implementation. In embodiments, to obtain the globally aggregated exit state, the sync logic 36, 76 only aggregates the local exit states from those tiles 4 in the specified sync group that executed a SYNC instruction, and not those that/those that executed a SANS instruction (the abstaining tile or tiles). Alternatively, the globally aggregated exit state is obtained by aggregating the local exit states from all the tiles 4 in the sync group that executed a SYNC and those that executed a SANS (both the participating and abstaining tiles 4). In the latter case, the local exit state output by the abstaining tile(s) 4 for global aggregation may be the actual locally aggregated exit state of that tile's workers at the time of executing the SANS, just as with the SYNC instruction (see description of local consensus register $LC 38). Alternatively the local "exit state" output by the abstaining tile 4 may be a default value, for instance the true value (e.g. logic 1) in embodiments where the exit state is binary. This prevents the abstaining tile 4 from interfering with the global exit state in embodiments where any false local exit state causes the global exit state to be false.

Regarding the return of the global exit state, there are two possibilities for this, regardless of whether or not the abstaining tile submits a local exit state for producing the global aggregate, and regardless of whether that value was an actual value or a default value. That is, in one implementation, the global aggregate exit state produced by the sync logic 36, 76 in the interconnect 34, 72 is stored only in the global consensus registers $GC 42 of the participating tiles 4, which executed a SYNC instruction, and not the abstaining tiles 4 which instead executed a SANS instruction. In embodiments, instead a default value is stored in the global consensus register $GX 42 of the tile(s) 4 that executed a SANS (the abstaining tiles). For instance this default value may be true, e.g. logic 1, in the case of a binary global exit state. In an alternative implementation however, the actual global aggregate produced by the sync logic 36, 76 is stored in the global consensus registers $GC 42 of both the participating tiles 4 which executed SYNC instructions and the abstaining tiles 4 which instead executed a SANS instruction. Thus all tiles in the group may still have access to the globally aggregated exit state.

Figure 13:
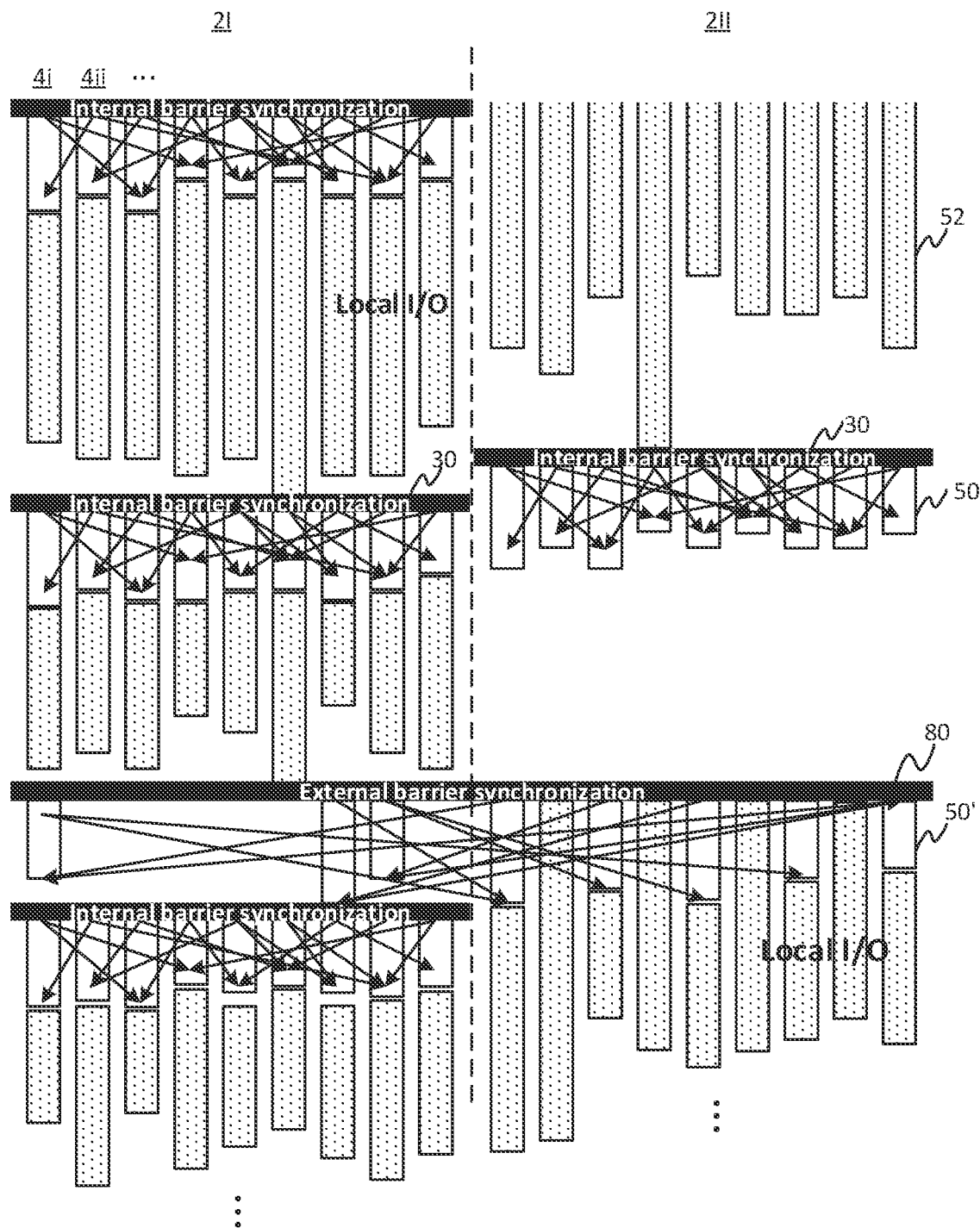
FIG. 13 is a schematic illustration of a multi-tier BSP scheme.

FIG. 13 illustrates an example BSP program flow involving both internal (on-chip) and external (inter-chip) synchronizations. As shown, the flow comprises internal exchanges 50 (of data between tiles 4 on the same chip 2) and the external exchanges 50' (of data between tiles 4 on different chips 2).

As illustrated in FIG. 13, according to embodiments it is disclosed to keep the internal BSP supersteps (comprising the internal exchanges 50 of data between tiles 4 on the same chip 2) separate from the external sync and exchange (comprising the external exchanges 50' of data between tiles 4 on different chips 2).

Figure 16:
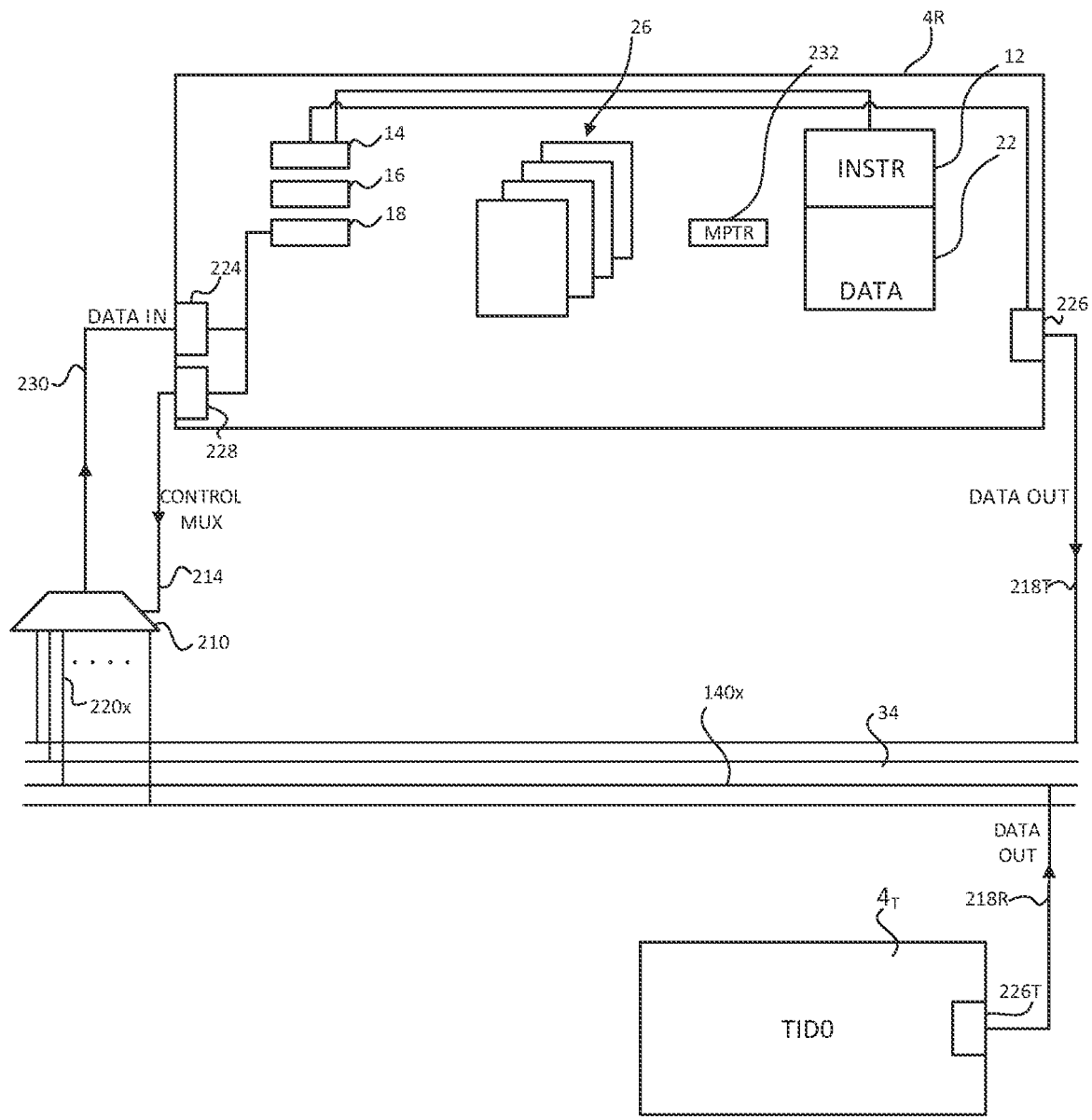

One reason to keep internal and external BSP separate is that, in embodiments, exchange of data via the internal (on-chip) interconnect 34 can be made time deterministic, as will be discussed in more detail shortly with reference to FIGS. 16 and 17; whereas exchange of data via an external interconnect 72 may be non-time-deterministic, e.g. due to a lossy physical channel which will require retransmission of messages. In general an external interconnect could be made time-deterministic but it may be difficult to do so or might confer too little advantage over a non-deterministic interconnect, and so may not be implemented in practice.

In such embodiments, it would be desirable to keep the internal communications time deterministic so that they can be conducted without the need for queues in the internal interconnect 34, since queues would incur an undesirable silicon footprint in the interconnect 34. However, in embodiments external communications may not be time deterministic. If every BSP superstep was a global exchange, then the time determinism would be "contaminated" by the non-time deterministic external exchanges. This is because once a given tile or thread has performed an external exchange, then the time determinism is lost and cannot be recovered until the next barrier synchronization.

As will be discussed in more detail shortly, the communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to listen to the address of the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

Another reason to separate the BSP into internal and external stages is that a global synchronization and exchange across multiple chips will be more "expensive" than for only an on-chip synchronization and exchange with the total cost being that of the aforementioned dinternal synchronization plus the additional delays required to aggregate this globally. Further, though in embodiments the sync signalling itself does not require flow control and is therefore relatively fast, the external synchronization syncs into an external exchange. An external exchange experiences longer latency and greater uncertainty versus an internal one.

Firstly, there is usually much less data bandwidth available inter-chip than on-chip. This is because inter-chip wiring density is limited by package connection (ball or pad) density which is much lower than the wiring density available on chip. So communicating a fixed amount of data between chips will take much longer than on-chip, even if transmission delays are similar. Also, external exchange is less local: wires reach further and hence are more capacitive, and more vulnerable to noise. This in turn may result in loss and hence the need for flow control mechanism which provides for retransmission at the physical layer, leading to reduced throughput (and loss of time determinism—see below). Further, as well as a greater physical distance, signalling and data transmitted between chips typically has to traverse greater amount of logic such as SerDes (serializers-deserializers) and flow control mechanisms, all of which adds extra delay compared to internal communications. For instance, the inventors have identified that using conventional technologies, an external barrier synchronization process can be expected to take of the order of ten times longer than an internal synchronization, and may account for 5-10% of the program running time. Using the hardware synchronization mechanism disclosed herein this can be reduced to the order of three times slower, but is still slower than an internal synchronization. Further, the exchange of data externally will, e.g. due to factors such as loss and retransmission at the physical layer due to noise, and/or serialization and deserialization between chips. In other variants the interconnect between chips may be lossless at the physical and/or link layer, but is actually lossy at the higher networking layer due to contention of network layer flows between different sources and destinations causing queues to be over-flowed and packets dropped. This is how Ethernet works and it is envisaged that an alternative non-time-deterministic interconnect may employ Ethernet.

Hence for one or more of the above reasons, it would be desirable to separate the BSP process into time-deterministic and non-time-deterministic stages, so as to prevent the time determinism of at least some of the time-deterministic exchanges within time-deterministic domains from being contaminated by the non-time deterministic exchanges between such domains.

Accordingly, the program may be arranged to perform a sequence of synchronizations, exchange phases and compute phases comprising in the following order: (i) a first compute phase, then (ii) an internal barrier synchronization 30, then (iii) an internal exchange phase 50, then (iv) an external barrier synchronization 80, then (v) an external exchange phase 50'. See chip 2II in FIG. 13. The external barrier 80 is imposed after the internal exchange phase 50, such that the program only proceeds to the external exchange 50' after the internal exchange 50. Note also that as shown with respect to chip 2I in FIG. 12, optionally a compute phase may be included between internal exchange (iii) and external barrier (iv).

This overall sequence is enforced by the program (e.g. being generated as such by the compiler). In embodiments the program is programmed to act in this way by means of the SYNC instruction described previously. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is ensured to be at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix. However, due to the loss of time determinism that occurs in the external interconnect 72 in some embodiments, then in such embodiments, once a tile has performed an external communication it cannot perform an internal communication again until the next synchronization (see below explanation of the preferred on-chip communication mechanism which relies on predetermined knowledge of message timing and inter-tile delays).

In some embodiments, also as shown in FIG. 13, some tiles 4 may perform local input/output during a compute phase, for example they may exchange data with a host.

Note also that as shown in FIG. 13, it is in general possible for any or all tiles to have a null compute phase 52 or a null exchange phase 50 in any given BSP superstep.

In embodiments, the different levels of sync zones 91, 92 may be used to constrain the extent of some of the external sync & exchange operations to only a subgroup of the chips 2 in the system, and limit the number of times the penalty of a full, global sync and exchange is needed. That is, the overall cycle may comprise: (i) a first compute phase, then (ii) an internal barrier synchronization, then (iii) an internal exchange phase, then (iv) an external barrier synchronization 80 within the tiles of only a first, lower level sync zone 91; then (v) an external exchange phase between only the chips of the first sync zone 91; then (vi) an external barrier synchronization across a second, higher level sync zone 92; then (vii) an external exchange phase amongst the chips of the second level sync zone 92. The external barrier to the second level exchange phase is imposed after the first level external exchange phase, such that the program only proceeds to the second level external exchange after the first level exchange phase. This behaviour may be programmed by using the SYNC instruction qualified by different levels of the external mode in its operand.

In embodiments the highest hierarchical level of sync zone encompasses all the tiles 4 on all chips 2 in the array 6, i.e. it is used to perform a global sync. When multiple lower-level zones are used, BSP may be imposed internally amongst the group of tiles 4 on the chip(s) 2 within each zone, but each zone may operate asynchronously with respect to one another until a global sync is performed.

Note: with regard to the lower-level external synchronization and exchange (iv)-(v), any of the lower-level zones 91A, 91B may each be performing its own instance of the lower-level external exchange in parallel with the other lower-level zone(s). And/or, in some cases multiple instances of (i)-(v) may be implemented before (vi)-(vii), i.e. there may be multiple instances of the lower-level external BSP superstep before the external sync and exchange. Further, the scheme could be extended to three or more hierarchical levels of sync zone.

The following describes an exemplary mechanism for communicating on-chip (internal exchange) without the need for queues. Reference is made to FIG. 16.

On each chip 2, the chip 2 comprises a respective clock which controls the timing of chip activity. The clock is connected to all of the chip's circuits and components. The chip 2 also comprises the internal, time-deterministic interconnect or "switching fabric" 34 to which all tiles and links are connected by sets of connection wires. In embodiments the interconnect 34 may be stateless, in that it has no state readable by software. Each set of connection wires is fixed end to end. The wires are pipelined. In this embodiment, a set comprises thirty-two wires. Each set can carry a packet consisting of one or more 32-bit datums, with one datum being transferred per clock cycle. But note herein that the word "packet" denotes a set of bits representing a datum (sometimes referred to herein as a data item), perhaps with one or more valid bit. The "packets" do not have headers or any form of destination identifier (which permits an intended recipient to be uniquely identified), nor do they have end-of-packet information. Instead, they each represent a numerical value input to or output from a tile. Each tile has its own local memory (described later). The chip has no shared memory. The switching fabric constitutes a cross set of connection wires only and also does not hold any state. Data exchange between tiles on the same chip is conducted on a time deterministic basis as described herein. A pipelined connection wire comprises a series of temporary stores, e.g. latches or flip flops which hold datum for a clock cycle before releasing it to the next store. Time of travel along the wire is determined by these temporary stores, each one using up a clock cycle of time in a path between any two points.

Each tile 4 indicates its synchronisation state to the sync controller 36 in the internal interconnect 34. Once it has been established that each tile 4 is ready to send data, the synchronisation process 30 causes the system to enter the exchange phase 50. Note that each tile experiences the sync-ack with a different but known time delay. The supervisor program inserts additional cycle delays as required such that each tile begins its exchange phase on the exact same cycle. In this exchange phase, data values move between tiles (in fact between the memories of tiles in a memory-to-memory data movement). In the exchange phase, there are no computations and therefore no concurrency hazards (or at least there are no computations that reply on data yet to be received from another tile 4). In the exchange phase, each datum moves along the connection wires on which it exits a tile from a transmitting tile to its recipient tile. At each clock cycle, datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic.

Each tile 4 runs a portion of the program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

Each tile 4 is associated with its own multiplexer 210. Each multiplexer has at least as many inputs as there are tile 4 on the chip, each input being connected to the switching fabric 34.

The cross wires of the switching fabric are connected to a data-out set of connection wires 218 from each tile (a broadcast exchange bus). For ease of illustration, not all crosswire are shown in FIG. 16. One set of crosswires is labelled 140x to indicate that it is one of a number of sets of crosswires.

When the multiplexer 210 is switched to the input labelled 220x then that will connect to the crosswires 140x and thus to the data bus 218T of the transmitting (sending) tile 4T. If the multiplexer is controlled to switch to that input at a certain time, then the datum received on the data bus 230 which is connected to the crosswire 140x will appear at the output of the multiplexer 210 at a certain time. It will arrive at the receiving tile 4R a certain delay after that, the delay depending on the distance of the multiplexer 210 from the receiving tile 4R. As the multiplexers tend to be arranged close to the switching fabric, the delay from the tile to the multiplexer can vary depending on the location of the receiving tile 4R.

To implement the switching, the local programs executed on the tiles 4 include switch control instructions (PUTi) which cause a multiplexer control signal 214 to be issued to control the multiplexer 210 associated with that tile to switch its input at a certain time ahead of the time at which a particular datum is expected to be received at the tile. In the exchange phase, multiplexers are switched and packets (data) are exchanged between tiles using the switching fabric. It can be seen from this explanation that the internal interconnect 34 has no state and requires no queues—the movement of each datum is predetermined by the particular crosswire to which the input of each multiplexer is connected.

In the exchange phase, all tiles 4 are permitted to communicate with all other tiles within its sync group. Each tile 4 has control of its own unique input multiplexer 210.

Incoming traffic can thus be selected from any other tile in the chip 2 (or from one of the external connection links in an external exchange). It is also possible for a multiplexer 210 to be set to receive a null input, i.e. no input, in any given exchange phase.

Each tile 4 has three interfaces: an "exin" interface 224 which passes data from the switching fabric 34 to the tile 4; an "exout" interface 226 which passes data from the tile to the switching fabric over the broadcast exchange bus 218; and an "exmux" interface 228 which passes the control mux signal 214 (mux-select) from the tile 4 to its multiplexer 210.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler, preferably at compile time, which needs to be aware of the following parameters.

Parameter I: the relative SYNC acknowledgement delay of each tile, RSAK (TID sending tile, TID receiving tile). This is a function of tile ID (TID) of the sending and receiving tiles, which is held in the TILE_ID register. This is a number of cycles always greater than or equal to 0 indicating when each tile receives the sync ack signal from the sync controller 36 relative to all other tiles. This can be calculated from the tile ID, noting that the tile ID indicates the particular location on the chip of that tile, and therefore reflects the physical distances. Put another way, the sync ack delays are equalized. If the transmitted tile 4T is closer to the sync controller 36 and the receiving tile 4R is further away, the consequence is that the sync acknowledgement delay will be shorter to the transmitting tile 4T than for the receiving tile 4R, and vice versa. A particular value will be associated with each tile for the sync acknowledgement delay. These values can be held for example in a delay table, or can be calculated on the fly each time based on the tile ID.

Parameter II: the exchange mux control loop delay, MXP (TID of receiving tile). This is the number of cycles between issuing an instruction (PUTi MUXptr) that changes a tile's input mux selection and the earliest point at which the same tile could issue a (hypothetical) load instruction for exchange data stored in memory as a result of the new mux selection. This comprises the delay of the control signal getting from the exmux interface 228R of recipients tile 4R to its multiplexer 210R and the length of the line from the output of the multiplexer to the data input exin interface 224.

Parameter III: the tile to tile exchange delay, TT (TID of sending tile, TID of receiving tile). This is the number of cycles between a SEND instruction being issued on one tile and the earliest point at which the receiving tile could issue a (hypothetical) load instruction pointing to the sent value in its own memory. This can be calculated from the TIDs of the sending and receiving tiles, either by accessing a table, or by calculating on the fly. This delay includes the time taken for data to travel from transmit tile 4T from its exout interface 226T to the switching fabric 14 along its exchange bus 218T and then via the input mux 210R at the receiving tile 4R to the ex in interface 224R of the receiving tile.

Parameter IV: the exchange traffic memory pointer update delay, MMP( ). This is the number of cycles between issuing an instruction (PUTi MEMptr) that changes a tile's exchange input traffic memory pointer 232 and the earliest point at which that same tile could issue a (hypothetical) load instruction for exchange data stored in memory as a result of the new pointer. This is a small, fixed number of cycles. The memory pointer 232 acts as a pointer into the data memory 202 and indicates where incoming data from the exin interface 224 is to be stored.

Together these parameters give the total inter-tile delay that will be experienced between transmission of a datum from the transmitting tile 4T and receipt of that datum by the receiving tile 4R. The particular exchange mechanism and parameters above are given only by way of example. Different exchange mechanisms may differ in the exact composition of the delay, but as long as the exchange is kept time deterministic, then it can be known by the programmer or compiler and thus exchange without queues is possible.

Figure 17:
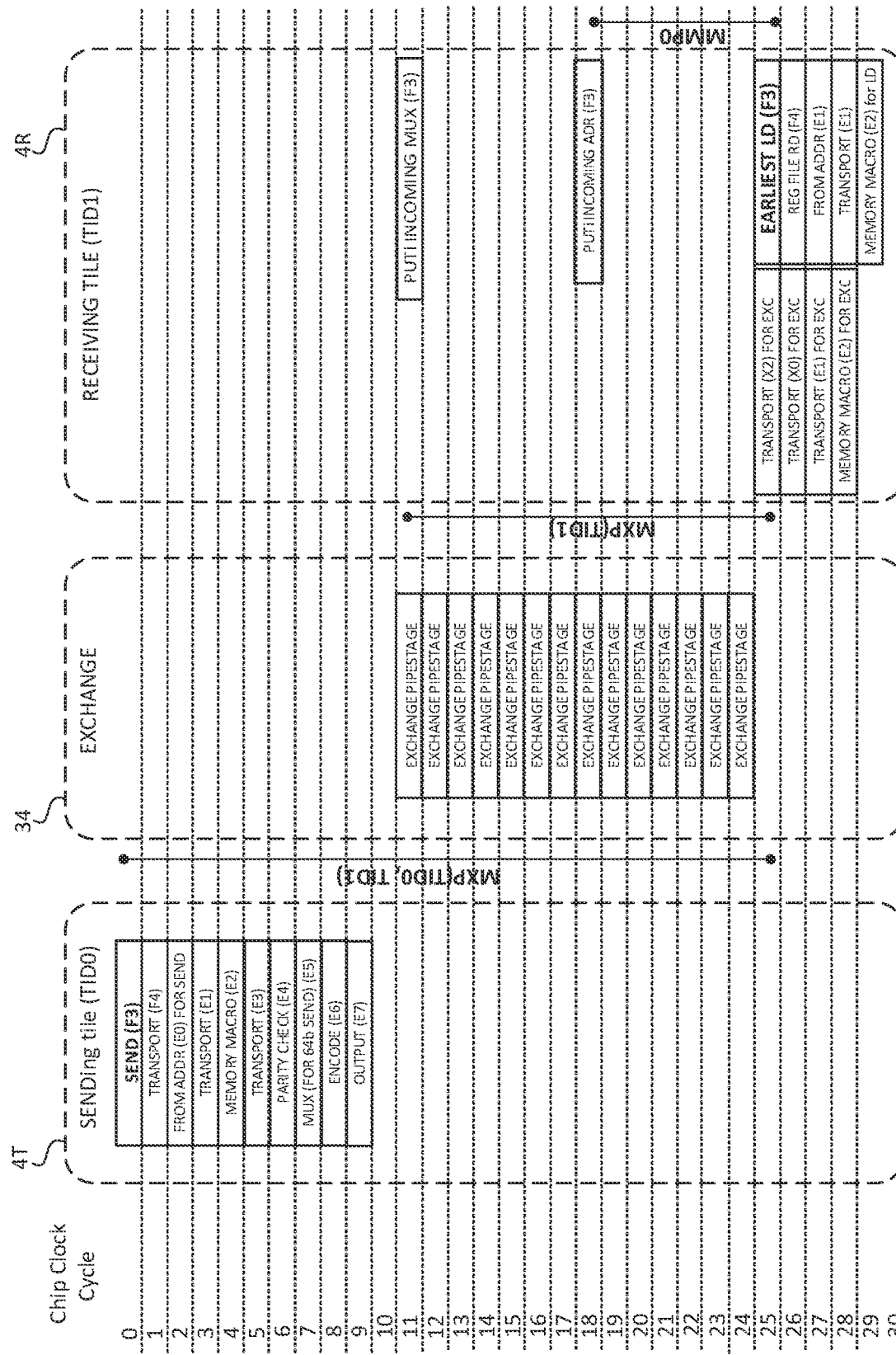

FIG. 17 shows the example exchange timings in more depth. On the left-hand side are shown the chip clock cycles running from 0-30. Action on the sending tile 4T occurs between clock cycles 0 and 9, starting with issuance of a send instruction (SEND E0). In clock cycles 10 through 24, the datum pipelines its way through the switching fabric 34.

Looking at the receiving tile 4R in IPU clock cycle 11 a PUTi instruction is executed that changes the tile input mux selection. In cycle 18, the memory pointer instruction is executed allowing for a load instruction in clock cycle 25. On the sending tile 4T, cycles 1 to 9 are an internal tile delay between the issuance of a SEND instruction and the manifestation of that data on the exout interface. E1, E2 etc. denote datum from earlier SEND instructor. In the exchange fabric 34, clock cycles 10 through 24 are labelled "exchange". In each of these cycles, a datum moves "one step" along the pipeline (between temporary stores). Cycles 25-29 on the recipient tile 4R denote the delay between receiving a datum at the exin interface and encoding it into memory.

In simple terms, if the processor of the receiving tile 4R wants to act on a datum which was the output of a process on the transmitting tile 4T, then the transmitting tile 4T has to execute a SEND instruction send at a certain time (e.g. clock cycle 0 in FIG. 17), and the receiving tile 4R has to execute a switch control instruction PUTi EXCH MXptr (as in clock cycle 11) by a certain time relative to the execution of the SEND instruction on the transmitting tile. This will ensure that the data arrives at the recipient tile in time to be loaded for use in a code-let being executed at the recipient tile 4R.

Note that the receive process at a recipient tile does not need to involve setting the memory pointer as with instruction PUTi MEMptr. Instead, the memory pointer 232 automatically increments after each datum is received at the exin interface 224. Received data is then just loaded into the next available memory location. However, the ability to change the memory pointer enables the recipient tile to alter the memory location at which the datum is written. All of this can be determined by the compiler or programmer who writes the individual programs to the individual tiles such that they properly communicate. This results in the timing of an internal exchange (the inter-tile exchange on chip) to be completely time deterministic. This time determinism can be used by the exchange scheduler to highly optimise exchange sequences.

FIG. 19 illustrates an exemplary mechanism for communicating off-chip (external exchange). This mechanism is non-time-deterministic. The mechanism is implemented in dedicated hardware logic in the external interconnect 72. Data is sent over the external interconnect 72 in the form of packets. Unlike the packets sent over the internal interconnect, these packets have headers: as the order of transmission can change, they require the destination address to be present in the packet header. Also in embodiments the external interconnect 72 takes the form of a network and therefore requires additional information for routing purposes.

At the physical layer the interconnect mechanism is lossy, but at the transaction layer the mechanism is not lossy due to the architecture of the link layer: if a packet is not acknowledged it will be resent automatically by the hardware in the interconnect 72. The possibility for loss and resending at the data link layer however means that the delivery of data packets over the external interconnect is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (step S1). The XREQ is a message comprising one or more control packets, indicating which of the tiles 4 have data packets (content) to send to another tile or tiles 4 on another chip 2. This is illustrated schematically in FIG. 19 by the ticks and crosses: by way of an example scenario, those labelled with a tick have data packets to send externally and those labelled with a cross do not. At step S2, The exchange block 78 sends an exchange-on (XON) control packet to a first of the tiles 4 with data to send externally. This causes the first tile to start sending its packets to the relevant destination via the external interconnect 78 (step S3). If at any time the XB is unable to continue sending packets to the interconnect (e.g. due to a previous packet loss and re-transmission in the interconnect, or due to over-subscription of the external interconnect by many other XBs and tiles) the XB will send an exchange-off (XOFF) to that tile before the XBs queue overflows. Once the congestion is cleared and the XB again has sufficient space in its queue it will send an XON to the tile allowing it to continue transmitting its content. Once this tile has sent its last data packet, then at step S4 the exchange block 78 sends an exchange-off (XOFF) control packet to this tile, then at step S5 sends another XON to the next tile 4 with data packets to send, and so forth. The signalling of XON and XOFF are implemented as a hardware mechanism in dedicated hardware logic in the form of the external exchange block 78.

It will be appreciated that this is just one example of a flow control mechanism for communicating external between chips. Other suitable mechanisms, in themselves, will be familiar to a person skilled in the art. Also, the possibility of a time-deterministic and/or queue-less external interconnect is not excluded.

Figure 15:
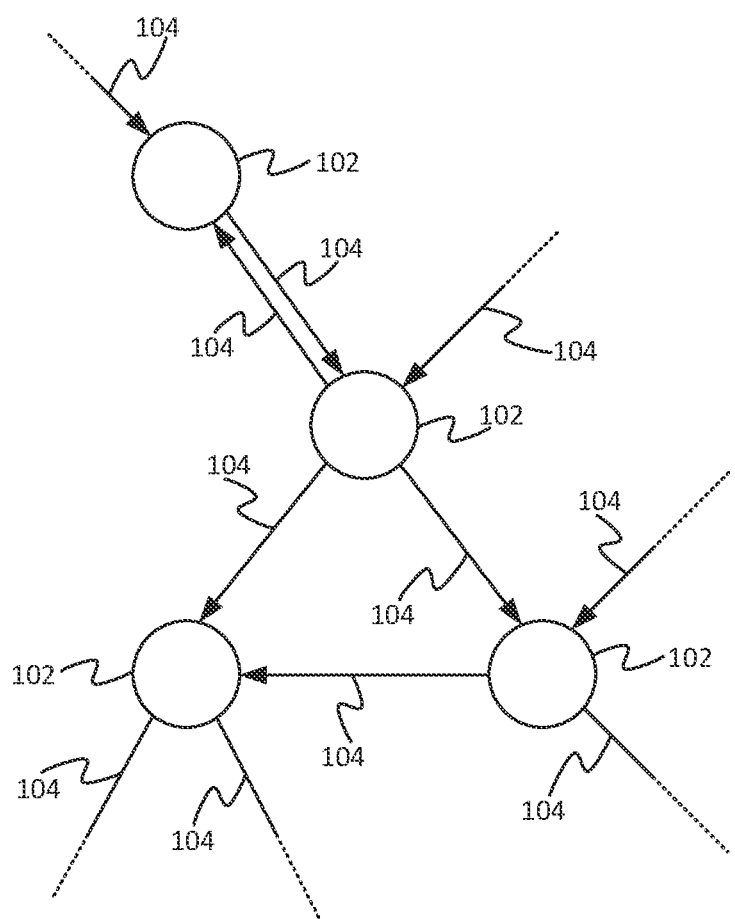
FIG. 15 is a schematic illustration of a graph used in a machine intelligence algorithm, FIG. 16 schematically illustrates an arrangement for exchanging data between tiles, FIG. 17 schematically illustrates a scheme of exchange timings.

FIG. 15 illustrates an example application of the processor architecture disclosed herein, namely an application to machine intelligence.

As will be familiar to a person skilled in the art of machine intelligence, machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case at least some of the edges 104 between nodes 102 correspond to the exchanges of data between threads, and some may involve exchanges between tiles. Furthermore, the individual exit states of the worker threads are used by the programmer to represent whether or not the respective node 102 has satisfied its respective condition for convergence of the parameter(s) of that node, i.e. has the error in the parameter or parameters fallen within the acceptable level or region in error space. For instance, this is one example use of the embodiments where each of the individual exit states is an individual bit and the aggregated exit state is an AND of the individual exit states (or equivalently an OR if 0 is taken to be positive); or where the aggregated exit state is a trinary value representing whether the individual exit states were all true, all false or mixed. Thus, by examining a single register value in the exit state register 38, the program can determine whether the graph as whole, or at least a sub-region of the graph, has converged to an acceptable degree.

As another variant of this, embodiments may be used where the aggregation takes the form of a statistical aggregation of individual confidence values. In this case each individual exit state represents a confidence (e.g. as a percentage) that the parameters of the node represented by the respective thread have reached an acceptable degree of error. The aggregated exit state can then be used to determine an overall degree of confidence as to whether the graph, or a subregion of the graph, has converged to an acceptable degree.

In the case of a multi-tile arrangement 6, each tile runs a subgraph of the graph. Each subgraph comprises a supervisor subprogram comprising one or more supervisor threads, and a set of worker threads in which some or all of the workers may take the form of codelets.

It will be appreciated that the above embodiments have been described by way of example only.

For instance, the scope of the present disclosure is not limited to a time-deterministic internal interconnect or a non-time-deterministic external interconnect. The grouping mechanism disclosed herein can also be used in a completely time-deterministic arrangement, or in a completely non-time-deterministic arrangement. For instance the ability to select different sync groups would still be useful so as to be able to control the degree of latency involved in a BSP exchange phase, keeping some exchanges to a smaller scale within a local area and only occasionally incurring the penalty of a wider or global exchange.

Where a split between time-deterministic and non-time-deterministic realms is used, it would also be possible to make the divide between the time-deterministic and non-time-deterministic realms in other ways. For instance it is not excluded to extend the time-deterministic domain across multiple chips 2, with different multi-chip time deterministic domains being connected by a non-time-deterministic interconnect (e.g. the different multi-chip time-deterministic domains being implemented on different cards or server chassis). Or as another example, different time-deterministic domains could be implemented on a given chip 2, with a non-time-deterministic on-chip interconnect being provided between such domains.

Further, where a time-deterministic interconnect is used, the implementation is not limited to use of an inter-tile delay look up table. Instead for example an analytical formula could be used to determine the inter-tile delay. Further, the inter-tile delay and the send and receive timings are not limited to being set by the compiler. E.g. alternatively they could be arranged manually by the programmer.

Further, the applicability of the techniques disclosed herein is not limited to the above-described architecture in which a separate context is provided for the supervisor thread, or in which the supervisor thread runs in a slot and then relinquishes its slot to a worker. In another arrangement for example, the supervisor may run in its own dedicated slot. Or the internal-external BSP concept may even be used in scenarios where one, some or all of the tiles on one, some or all of the chips employ non-multithreaded execution.

Where multithreaded tiles are used, the terms "supervisor" and "worker" do not necessarily have to imply specific responsibilities expect where otherwise explicitly stated, and particularly are do not in themselves necessarily limit to the above-described scheme in which a supervisor thread relinquishes its time slot to a worker, and so forth. In general, worker thread may refer to any thread to which some computational task is allocated. The supervisor may represent any kind of overseeing or coordinating thread responsible for actions such as: assigning workers to barrel slots, and/or performing barrier synchronizations between multiple threads, and/or performing any control-flow operation (such as a branch) in dependence on the outcome of more than one thread.

Where reference is made to a sequence of interleaved time slots, or the like, this does not necessarily imply that the sequence referred to makes up all possible or available slots. For instance, the sequence in question could be all possible slots or only those currently active. It is not necessarily precluded that there may be other potential slots that are not currently included in the scheduled sequence.

The term tile as used herein does not necessarily limit to any particular topography or the like, and in general may refer to any modular unit of processing resource comprising a processing unit 10 and corresponding memory 11, in an array of like modules, typically on the same chip (same die).

Furthermore, where reference is made herein to performing a synchronization or an aggregation between a group of tiles, or a plurality of tiles or the like, this does not necessarily have to refer to all tile on the chip or all tiles in the system unless explicitly stated. E.g. the SYNC and EXIT instructions could be configured to perform the synchronization and aggregation only in relation to a certain subset of tiles 4 on a given chip and/or only a subset of chips 2 in a given system; whilst some other tiles 4 on a given chip, and/or some other chips in a given system, may not be involved in a given BSP group, and could even be being used for some completely separate set of tasks unrelated to the computation being performed by the group at hand.

Further, the above-described synchronization schemes do not exclude the involvement, in embodiments, of external resources other than multi-tile processors, e.g. a CPU processor such as the host processor, or even one or more components that are not processors such as one or more network cards, storage devices and/or FPGAs. For instance, some tiles may elect to engage in data transfers with an external system where these transfers form the computational burden of that tile. In this case the transfers should be completed before the next barrier. In some cases the exit state of the tile may depend on a result of the communication with the external resource, and this the resource may vicariously influence the exit state. Alternatively or additionally, resources other than multi-tile processors, e.g. the host or one or more FPGAs, could be incorporated into the synchronization network itself. That is to say, a sync signal such as a Sync_req is required from this/these additional resources in order for the barrier synchronization to be satisfied and the tiles to proceed to the next exchange phase. Further, in embodiments the aggregated global exit state may include in the aggregation an exit state of the external resource, e.g. from an FPGA.

Also, while certain modes of SYNC instruction have been described above, the scope of the present disclosure more generally is not limited to such modes. For instance, the list of modes given above is not necessarily exhaustive. Or in other embodiments, the SYNC instruction may have fewer modes, e.g. the SYNC need not support different hierarchical levels of external sync, or need not distinguish between on-chip and inter-chip syncs (i.e. in an inter-tile mode, always acts in relation to all tiles regardless of whether on chip or off chip).

In yet further variations, the SYNC instruction could take a greater number of possible modes to accommodate a greater granularity or range of hierarchical sync zones 91, 92; or simply a different set of modes to accommodate different division of the system into hierarchical zones. For instance, as well as allowing selection between internal (on-chip) and external (off-chip) synchronization (or even as an alternative to this), the modes of the SYNC instruction may be configured to recognize other physical breakpoints further out beyond one chip (e.g. one IC package, one card, one box of cards etc.). Or even if no dedicated SYNC instruction is used, such divisions may be implemented by the programmer or compiler using general purpose code. So in embodiments, one of the hierarchical sync zones (e.g. one of the modes of the SYNC instruction) may consist of all the tiles on all the chips on the same IC package (but none of the tiles or chips beyond that). Alternatively or additionally, one of the hierarchical sync zones (e.g. again one of the modes of the SYNC instruction) may consist of all the tiles on all the chips on the same card (but none of the tiles, chips or packages beyond that). As another alternative or additional example, one of the hierarchical sync zones (e.g. again another possible mode of the SYNC instruction) may consist of all the tiles on all the chips on all the cards in the same physical box, e.g. same chassis (but none of the tiles, chips or boxes beyond that). This would be advantageous because communication between IC packages, cards and boxes will tend to incur an even greater penalty than just between chips (dies) in the same package.

Furthermore, the sync zones are not limited to being hierarchical (i.e. one nested in another), and in other embodiments the selectable sync zones may consist of or include one or more non-hierarchical groups (all tiles of that group not nested within a single other selectable group).

Other applications and variants of the disclosed techniques may become apparent to a person skilled in the art once given the disclosure herein. The scope of the present disclosure is not limited by the described embodiments but only by the accompanying claims.

What is claimed is:

1. An integrated circuit comprising a plurality of tile processors and an on-chip interconnect for communicating between the tile processors, wherein each of the tile processors includes a memory for storing a set of compiled instructions, and an execution unit for executing a respective set of compiled instructions,
   wherein the plurality of tile processors includes a first subset of tile processors forming a first synchronisation group, wherein each of the first subset of tile processors is configured to, using its respective execution unit, execute its set of compiled instructions to:
      operate in a first compute phase of the first synchronisation group, during which data is processed by the first subset of tile processors; and
      operate in a first exchange phase of the first synchronisation group, during which data is exchanged between different tile processors of the first subset of tile processors, the first exchange phase being separated from the first compute phase by a first barrier synchronisation; and
      participate in the first barrier synchronisation so as to transition between the first compute phase and the first exchange phase once all of the first subset of tile processors have completed a first current phase, the first current phase being either the first exchange phase or the first compute phase;
   wherein the plurality of tile processors includes a second subset of tile processors forming a second synchronisation group, wherein the second synchronisation group is configured to operate asynchronously with respect to the first synchronisation group, wherein each of the second subset of tile processors is configured to, using its respective execution unit, execute its set of compiled instructions to:
      operate in a second compute phase for the second synchronisation group, in which data is processed by the second subset of tile processors; and
      operate in a second exchange phase for the second synchronisation group in which data is exchanged between different tile processors of the second subset of tile processors, the second exchange phase being separated from the second compute phase by a second barrier synchronisation; and
      participate in the second barrier synchronisation so as to transition between the second compute phase and the second exchange phase once all of the second subset of tile processors have completed a second current phase, the second current phase being either the second exchange phase or the second compute phase.

2. The integrated circuit of claim 1, wherein the step of transitioning between the first compute phase and the first exchange phase comprises transitioning from the first compute phase to the first exchange phase, wherein the first current phase is the first compute phase.

3. The integrated circuit of claim 2, wherein for each of at least some of the first subset of tile processors:
   a respective execution unit is configured to run a plurality of worker threads each of which has computation tasks to perform during the first compute phase; and
   once each of a respective plurality of worker threads has completed its computation tasks for the first compute phase, the respective execution unit causes a synchronisation request to be transmitted to synchronisation logic of the integrated circuit.

4. The integrated circuit of claim 1, wherein the step of transitioning between the second compute phase and the second exchange phase comprises transitioning from the second compute phase to the second exchange phase, wherein the second current phase is the second compute phase.

5. The integrated circuit of claim 1, wherein the step of transitioning between the first compute phase and the first exchange phase comprises transitioning from the first exchange phase to the first compute phase, wherein the first current phase is the first exchange phase.

6. The integrated circuit of claim 1, wherein the step of transitioning between the second compute phase and the second exchange phase comprises transitioning from the second exchange phase to the second compute phase, wherein the second current phase is the second exchange phase.

7. The integrated circuit of claim 1, wherein each of the first subset of tile processors is configured to:
perform the step of transitioning between the first compute phase and the first exchange phase in response to receipt of an indication that all of the first subset of tile processors have completed the first current phase.

8. The integrated circuit of claim 7, wherein for each of the first subset of tile processors, the indication that all of the first subset of tile processors have completed the first current phase is received via at least one dedicated sync wire for a respective tile processor.

9. The integrated circuit of claim 7, wherein each of the first subset of tile processors is configured to, upon completing the first current phase, transmit a synchronisation request to synchronisation logic of the integrated circuit,
wherein the indication that all of the first subset of tile processors have completed the first current phase comprises a synchronisation acknowledgment sent by the synchronisation logic upon receipt of all of the synchronisation requests transmitted by the first subset of tile processors.

10. The integrated circuit of claim 1, wherein each of the second subset of tile processors is configured to:
perform the step of transitioning between the second compute phase and the second exchange phase in response to receipt of an indication that all of the second subset of tile processors have completed the second current phase.

11. The integrated circuit of claim 1, wherein for each of the first subset of tile processors:
the set of compiled instructions running on a respective tile processor comprises a synchronisation instruction executed by the execution unit of the respective tile processor upon completing the first current phase.

12. The integrated circuit of claim 11, wherein the synchronisation instruction takes an operand which selects one of a plurality of synchronisation groups for the first barrier synchronisation, wherein the operand specifies the first synchronisation group.

13. The integrated circuit of claim 1, wherein for at least one tile processor of the first subset of tile processors, the respective set of compiled instructions includes an abstain instruction which, when executed by the execution unit of the respective tile processor, causes the respective tile processor to opt out of a further barrier synchronisation for the first synchronisation group.

14. The integrated circuit of claim 1, configured to operate in an internal mode in which all of the first subset of tile processors and the second subset of tile processors belong to a third synchronisation group, wherein, when operating in the internal mode, a cycle of compute, exchange and barrier synchronisation is imposed between all of the first subset of tile processors and the second subset of tile processors.

15. The integrated circuit of claim 1, configured to operate in a global mode in which all of the first subset of tile processors and the second subset of tile processors belong to a fourth synchronisation group, wherein the fourth synchronisation group includes further tile processors on other integrated circuits, wherein, when operating in the global mode, a cycle of compute, exchange and barrier synchronisation is imposed between all of the first subset of tile processors and the second subset of tile processors and all of the further tile processors.

16. The integrated circuit of claim 1, wherein for each of the first subset of tile processors, a respective execution unit is configured to:
in response to completing the first current phase, suspend instruction issue on a respective tile processor pending receipt of an indication that all of the first subset of tile processors have completed the first current phase.

17. The integrated circuit of claim 16, wherein the first current phase is a first compute phase.

18. The integrated circuit of claim 1, wherein the first compute phase, first exchange phase, and first barrier synchronisation form part of a bulk synchronous parallel scheme for conducting communications for the first subset of tile processors.

19. A method implemented in an integrated circuit comprising a plurality of tile processors and an on-chip interconnect for communicating between the tile processors, wherein the method comprises:
operating a first subset of the plurality of tile processors in a first synchronisation group;
operating a second subset of the plurality of tile processors in a second synchronisation group, wherein the second synchronisation group is operated asynchronously with respect to the first synchronisation group;
for a first tile processor of the first subset of the plurality of tile processors:
operating the first tile processor in a first compute phase of the first synchronisation group; and
operating the first tile processor in a first exchange phase of the first synchronisation group, the first exchange phase being separated from the first compute phase by a first barrier synchronisation; and
participating in the first barrier synchronisation in response to all of the first subset of the plurality of tile processors having completed either the first exchange phase or the first compute phase; and
for a second tile processor of the second subset of the plurality of tile processors:
operating in a second compute phase for the second synchronisation group; and
operating in a second exchange phase for the second synchronisation group, the second exchange phase being separated from the second compute phase by a second barrier synchronisation; and
participating in the second barrier synchronisation in response to all of the second subset of the plurality of tile processors having completed either the second exchange phase or the second compute phase.

20. A non-transitory computer readable medium storing a computer program comprising sets of computer readable instructions for execution by each of a plurality of tile processors of an integrated circuit, wherein the computer program is such that, when the sets of computer readable instructions are executed by the plurality of tile processors, a method is performed, the method comprising:
- operating a first subset of the plurality of tile processors in a first synchronisation group;
- operating a second subset of the plurality of tile processors in a second synchronisation group, wherein the second synchronisation group is operated asynchronously with respect to the first synchronisation group;
- for a first tile processor of the first subset of the plurality of tile processors:
  - transitioning between a first compute phase of the first synchronisation group and a first exchange phase of the first synchronisation group once all of the first subset of the plurality of tile processors have completed either the first exchange phase or the first compute phase; and
- for a second tile processor of the second subset of the plurality of tile processors:
  - transitioning between a second compute phase of the second synchronisation group and a second exchange phase of the second synchronisation group once all of the second subset of the plurality of tile processors have completed either the second exchange phase or the second compute phase.

* * * * *